(12) United States Patent
Nonaka et al.

(10) Patent No.: US 11,865,815 B2
(45) Date of Patent: *Jan. 9, 2024

(54) POLYMETHALLYL ALCOHOL RESIN COMPOSITION AND MOLDING CONTAINING SAME

(71) Applicant: KURARAY CO., LTD., Kurashiki (JP)

(72) Inventors: Yasuhiro Nonaka, Kurashiki (JP); Yasutaka Inubushi, Kurashiki (JP)

(73) Assignee: KURARAY CO., LTD., Kurashiki (JP)

(*) Notice: Subject to any disclaimer, the term of this patent is extended or adjusted under 35 U.S.C. 154(b) by 135 days.

This patent is subject to a terminal disclaimer.

(21) Appl. No.: 15/535,279

(22) PCT Filed: Dec. 24, 2015

(86) PCT No.: PCT/JP2015/086107
§ 371 (c)(1),
(2) Date: Jun. 12, 2017

(87) PCT Pub. No.: WO2016/104648
PCT Pub. Date: Jun. 30, 2016

(65) Prior Publication Data
US 2017/0361581 A1    Dec. 21, 2017

(30) Foreign Application Priority Data
Dec. 24, 2014 (JP) .................................. 2014-260487

(51) Int. Cl.
*B32B 27/00* (2006.01)
*C08F 8/04* (2006.01)
(Continued)

(52) U.S. Cl.
CPC ............... *B32B 27/00* (2013.01); *C08F 8/04* (2013.01); *C08K 3/16* (2013.01); *C08K 5/09* (2013.01);
(Continued)

(58) Field of Classification Search
CPC .. C08L 29/02; C08K 3/16; C08K 3/22; C08K 3/28; C08K 3/32; C08K 5/09;
(Continued)

(56) References Cited

U.S. PATENT DOCUMENTS 2,545,182 A * 3/1951 Whetstone ................ C08F 8/12
  525/329.5
3,053,790 A * 9/1962 Lewis ........................ C08F 8/00
  264/184

(Continued)

FOREIGN PATENT DOCUMENTS

CN 102803378 11/2012
EP 0837078 4/1998
(Continued)

OTHER PUBLICATIONS http://www.seastarchemicals.com/wp-content/uploads/cofa/BASELINE/06%20Acetic/Archive/2013/SCI6213090.pdf; 2014.*
(Continued)

*Primary Examiner* — Michael B Nelson
(74) *Attorney, Agent, or Firm* — Oblon, McClelland, Maier & Neustadt, L.L.P.

(57) ABSTRACT

Provided is a resin composition containing polymethallyl alcohol (A) having a repeating structural unit represented by the following formula (1) in an amount of greater than or equal to 30 mol %, and a component (B) that is at least one of an acid component having a pKa of 3.5 to 7.5 and an anion of the acid component, the pKa being a logarithmic value of a reciprocal of an acid dissociation constant at 25° C., a content of the component (B) being greater than or equal to 0.01 μmol per 1 g of the polymethallyl alcohol (A); a method of producing the resin composition; and a molding containing the resin composition.

(Continued)

US 11,865,815 B2
Page 2

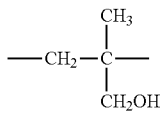

(1)

18 Claims, 4 Drawing Sheets

(51) Int. Cl.
| | |
|---|---|
| C08K 3/16 | (2006.01) |
| C08K 5/09 | (2006.01) |
| C08K 5/098 | (2006.01) |
| C08K 5/51 | (2006.01) |
| C08K 5/52 | (2006.01) |
| C08K 5/092 | (2006.01) |
| C08L 29/02 | (2006.01) |
| C08L 29/06 | (2006.01) |

(52) U.S. Cl.
CPC .............. *C08K 5/092* (2013.01); *C08K 5/098* (2013.01); *C08K 5/51* (2013.01); *C08K 5/52* (2013.01); *C08L 29/02* (2013.01); *C08L 29/06* (2013.01); *C08K 2201/014* (2013.01)

(58) Field of Classification Search
CPC .......... C08K 5/092; C08K 5/098; C08K 5/51; C08K 5/52; C08K 2003/329; C08K 2201/014; C08K 3/10; B32B 2307/7244; B32B 27/08; B32B 27/30
See application file for complete search history.

(56) References Cited

U.S. PATENT DOCUMENTS

| | | | | |
|---|---|---|---|---|
| 6,096,393 | A * | 8/2000 | Ikeda .................. | B32B 27/08 428/34.7 |
| 6,960,376 | B2 | 11/2005 | Tai et al. | |
| 2007/0110854 | A1* | 5/2007 | Bagley ................ | B65D 81/28 426/106 |
| 2007/0241308 | A1 | 10/2007 | Uradnisheck | |
| 2008/0096047 | A1 | 4/2008 | Yamane et al. | |
| 2008/0190999 | A1* | 8/2008 | Tomasini ............. | B65D 81/28 229/87.08 |
| 2014/0336325 | A1 | 11/2014 | Bauer et al. | |
| 2016/0237271 | A1* | 8/2016 | Koehnke .............. | C08J 3/226 |

FOREIGN PATENT DOCUMENTS

| | | |
|---|---|---|
| JP | 46-37664 | 11/1971 |
| JP | 2-255752 A | 10/1990 |
| JP | 10-330508 A | 12/1998 |
| JP | 11-291405 A | 10/1999 |
| JP | 2002-284886 A | 10/2002 |
| JP | 2005-144761 A | 6/2005 |
| JP | 2009-536973 A | 10/2009 |
| JP | 2014-51037 A | 3/2014 |
| WO | 01/96464 A1 | 12/2001 |
| WO | 2007/120852 A2 | 10/2007 |
| WO | WO 2010/016034 * | 12/2010 |

OTHER PUBLICATIONS

International Search Report dated Mar. 22, 2016 in PCT/JP2015/086107 filed Dec. 24, 2015.
Office Action dated Jun. 30, 2020, in corresponding Chinese Patent Application No 201580070836.1 (with English translation).
Office Action in Chinese Application No. 201580070649.3, dated Feb. 3, 2020. (w/English Abstract).
Chinese Office Action dated Jul. 3, 2019, in Patent Application No. 201580070649.3, 16 pages (with English translation).
Deren, Z., "Polymer Synthesis Technology", Chemical Industry Press, 1$^{st}$ edition, 15 pages (with English translation of relevant portion).
Jianchen, B., "Plastic Molding Technology", Beijing Institute of Technology Press, the 1$^{st}$ edition of Dec. 2012, 10 pages (with English translation of relevant portion).
Dingzhu, W., "A Complete Collection of Composite Materials", Chemistry Industry Press, the 1$^{st}$ edition of Jan. 2000, 8 pages (with English translation of relevant portion).
Lei, D., "The Latest Practical Handbook of Variety Optimized Selection, Performance Assay Standards and Applied Technology of Plastic Adjuvants"Yinsheng Audio-visual Publishing House, Oct. 2004, 7 pages (with English translation of relevant portion).
Copper(II) Acetate, Sigma-Aldrich (NPL document retrieved Jun. 12, 2019).
Sodium Stearate, PubChem (NPL document retrieved Jun. 12, 2019).
Office Action dated Jan. 8, 2019 in the corresponding Japanese Patent Application No. 2016-566475 with English Translation 5 pages.
Office Action and Search Report dated Jan. 28, 2019 in the corresponding Chinese Patent Application No. 201580070649.3 with English Translation and English Translation of Category of cited document 13 pages.
International Search Report dated Mar. 22, 2016 in PCT/JP2015/086108 filed Dec. 24, 2015.
Office Action dated Jul. 8, 2020, in U.S. Appl. No. 15/538,296.
Office Action dated Jun. 17, 2019, in U.S. Appl. No. 15/538,296.
Office Action dated Jan. 12, 2021, in Chinese Patent Application No. 201580070836.1 (with English translation).
Han Wei-wei, "Research Progress and Applications of Beta-Methallyl Alcohol Production Technology", pp. 1513-1514, Dec. 2014 (with English translation).

\* cited by examiner

POLYMETHALLYL ALCOHOL RESIN COMPOSITION AND MOLDING CONTAINING SAME

TECHNICAL FIELD

The present invention relates to a resin composition containing polymethallyl alcohol and a method of producing the resin composition. Further, the present invention relates to a molding containing the resin composition.

BACKGROUND ART

Currently, a gas barrier material containing a resin excellent in performance of blocking a gas such as oxygen (gas barrier properties) has been widely used mainly in a field of a packing material having, for example, food or medicine as a content. A molding such as a packing material is generally produced by heat-melt molding, and therefore, the resin is required to have, in addition to the gas barrier properties, thermal stability such as coloring resistance (properties of not causing coloring such as yellowing by heat) and long-run properties (properties of not changing physical properties such as viscosity even in melt molding for a long period of time). Further, when a layer is laminated on a layer made from the resin, interlayer adhesiveness is also required so that the layers do not easily separate from each other.

Conventionally known as the resin material excellent in gas barrier properties are vinyl alcohol copolymers that are represented by an ethylene-vinyl alcohol copolymer (hereinafter, also referred to as "EVOH") [for example, WO 01/096464 A1 (PTD 1)] and methallyl alcohol copolymers [for example, Japanese Patent Laying-Open No. H10-330508 (PTD 2)].

CITATION LIST

Patent Document

PTD 1: WO 01/096464 A1
PTD 2: Japanese Patent Laying-Open No. H10-330508

SUMMARY OF INVENTION

Technical Problems

The EVOH is a representative example of the gas barrier material, however, is insufficient in thermal stability, interlayer adhesiveness, and gas barrier properties in a high humidity environment. PTD 1 describes that an EVOH can contain a carboxylic acid (a1) having a molecular weight of greater than or equal to 75 at a predetermined content rate and a predetermined amount of a carboxylic acid (A) having a pKa of preferably greater than or equal to 3.5 to improve the thermal stability and the interlayer adhesiveness, while the EVOH is inferior in gas barrier properties in a high humidity environment to be limited in its use application and use forms. In addition, the EVOH is also insufficient in water vapor barrier properties so that it has been necessary to use the EVOH as a multilayer structure by combining the EVOH with a material excellent in water vapor barrier properties when the water vapor barrier properties are required.

In contrast, a methallyl alcohol copolymer described in PTD 2 exhibits excellent gas barrier properties even in a high humidity environment and is excellent in transparency and melt moldability, while still having room for improvement in thermal stability such as coloring resistance and long-run properties, and further in interlayer adhesiveness. The "melt moldability" referred to in PTD 2 means that melt molding is easily performed and does not mean the long-run-properties.

Therefore, an object of the present invention is to provide polymethallyl alcohol (hereinafter, sometimes abbreviated as PMAL) resin composition excellent in gas barrier properties in high humidity and thermal stability (coloring resistance and long-run properties), and a molding containing the resin composition.

Solutions to Problems

The present invention provides a PMAL resin composition, a molding containing the PMAL resin composition, and a method of producing the PMAL resin composition that are described below.

[1] A resin composition containing:
polymethallyl alcohol (A) having a repeating structural unit represented by the following formula (1) in an amount of greater than or equal to 30 mol %; and
a component (B) that is at least one of an acid component having a pKa of 3.5 to 7.5 and an anion of the acid component, the pKa being a logarithmic value of a reciprocal of an acid dissociation constant at 25° C.,
a content of the component (B) being greater than or equal to 0.01 μmol per 1 g of the polymethallyl alcohol (A).

[Chemical Formula 1]

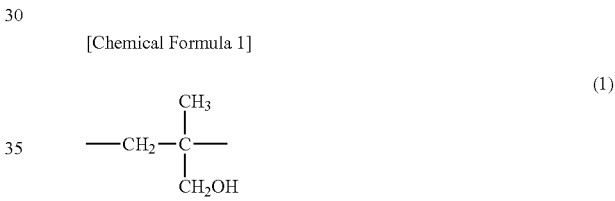

[2] The resin composition according to [1], further containing a metal ion (C), wherein
a content of the metal ion (C) is 0.05 to 45 μmol per 1 g of the polymethallyl alcohol (A).
[3] A molding containing the resin composition according to [1] or [2].
[4] The molding according to [3], including at least one layer that contains the resin composition.
[5] The molding according to [4], being a multilayer structure including at least one layer that contains the resin composition and at least one other layer.
[6] The molding according to [5], including at least one layer that contains the resin composition and a thermoplastic resin layer laminated on one surface or both surfaces of the layer that contains the resin composition.
[7] The molding according to [6], including a layer that has a thickness of 0.1 to 1000 μm and contains the resin composition.
[8] The molding according to any one of [3] to [7], being a packing material.
[9] A method of producing the resin composition according to [1] or [2], including, in the following order, the steps of:
producing the polymethallyl alcohol (A); and
mixing the obtained polymethallyl alcohol (A) with the component (B).
[10] The method according to [9], wherein the mixing includes contacting the polymethallyl alcohol (A) with a liquid containing the component (B).

[11] The method according to [9], wherein the mixing includes adding a liquid containing the component (B) to the polymethallyl alcohol (A) melted.

[12] The method according to [10] or [11], wherein the liquid containing the component (B) further contains a metal ion (C).

[13] The method according to [9], wherein the mixing includes dry-blending the component (B) with the polymethallyl alcohol (A).

Advantageous Effects of Invention

According to the present invention, there can be provided a PMAL resin composition excellent in gas barrier properties in high humidity and in thermal stability, and a molding.

DESCRIPTION OF EMBODIMENTS

<Resin Composition>

Figure 1:
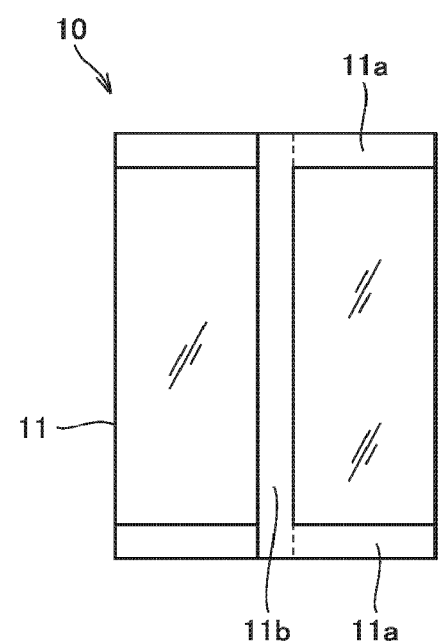
FIG. 1 is a schematic view of a vertically-made, filled, and sealed bag according to one embodiment of a multilayer structure (packing material) of the present invention.

A resin composition of the present invention contains PMAL (A) and a component (B) that is at least one of an acid component having a pKa of 3.5 to 7.5 and an anion of the acid component, the pKa being a logarithmic value of the reciprocal of an acid dissociation constant at 25° C. (hereinafter, also simply referred to as a component (B)). The resin composition may also contain a metal ion (C) as a suitable component. Hereinafter, each of the components is described.

(PMAL (A))

The PMAL (A) is a resin including a repeating structural unit (hereinafter, also referred to as a "structural unit (1)") that is derived from methallyl alcohol and is represented by the following formula (1):

[Chemical Formula 2]

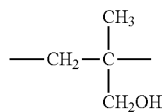

(1)

The content of the structural unit (1) in the resin is greater than or equal to 30 mol %, and is preferably in the range of 45 to 100 mol %, more preferably in the range of 70 to 100 mol %, further preferably in the range of 80 to 100 mol % from the viewpoint of gas barrier properties. With the content of the structural unit (1) less than 30 mol %, sufficient gas barrier properties cannot be obtained.

One other structural unit than the structural unit (1) that can be included in the PMAL (A) is not particularly limited as long as the other structural unit does not give a large adverse effect on the gas barrier properties and the thermal stability. Examples of the other structural unit include hydroxy group-containing monomers such as allyl alcohol, vinyl alcohol, 3,4-diol-1-butene, 2-methylene-1, and 3-propanediol; (meth)acrylic acid ester monomers such as methyl (meth)acrylate, ethyl (meth)acrylate, and butyl (meth)acrylate; carboxyl group-containing monomers such as (meth) acrylic acid and crotonic acid; olefin monomers such as ethylene, propylene, 1-butene, isobutene, 1-pentene, 1-hexene, and 1-octene; diene monomers such as butadiene and isoprene; aromatic substituted vinyl monomers such as styrene, α-methylstyrene, o-, m-, p-methylstyrene, and vinylnaphthalene; vinyl ether monomers such as methyl vinyl ether, ethyl vinyl ether, and butyl vinyl ether; vinyl halide monomers such as vinyl chloride and vinyl fluoride; vinylidene halide monomers such as vinylidene chloride and vinylidene fluoride; nitrile monomers such as acrylonitrile and methacrylonitrile; and maleic acid derivative monomers such as maleimide, N-methylmaleimide, N-ethylmaleimide, N-cyclohexylmaleimide, and dimethyl maleate. The PMAL (A) may have only one other structural unit or two or more other structural units.

When the PMAL (A) has one other structural unit than the structural unit (1), the PMAL (A) can be obtained by copolymerization of methallyl alcohol that forms the structural unit (1) with the copolymerization components described above. The copolymerization method may be either random copolymerization or alternating copolymerization. However, in cases where the content of the other structural unit is high (for example, cases where the content is greater than or equal to 30 mol %), it is preferable to enhance alternating polymerizability from the viewpoint of gas barrier properties. High alternating copolymerizability can give excellent gas barrier properties even when the content of the structural unit (1) is in the range of 30 to 60 mol %.

A lower limit value of a melt flow rate (MFR) of the PMAL (A) is, as a measured value at a temperature of 210° C. and a load of 2160 g, preferably 0.01 g/10 min, more preferably 0.05 g/10 min, further preferably 0.1 g/10 min, particularly preferably 0.3 g/10 min. On the other hand, an upper limit value of the MFR is, as a measured value under the same conditions, preferably 200 g/10 min, more preferably 50 g/10 min, further preferably 30 g/10 min, particularly preferably 15 g/10 min, most preferably 10 g/10 min. The MFR adjusted in the above ranges allows easy melt molding and can enhance coloring resistance and long-run properties of the resin composition. Examples of a method of adjusting the MFR in the above ranges include a method of adjusting degree of polymerization of the PMAL (A) and a method of adjusting the type of a copolymerization component. In view of, for example, the gas barrier properties, the coloring resistance, and the long-run properties of the resin composition and a molding obtained from the resin composition, not only the PMAL (A) itself, but also the resin composition and the molding that include the PMAL (A) also preferably have an MFR in the ranges described above. The PMAL (A) preferably has a number average degree of polymerization of 100 to 10000.

Oxygen permeability of the resin composition at a temperature of 20° C. and a relative humidity of 65% is preferably less than or equal to 10 mL·20 μm/(m²·day·atm), more preferably less than or equal to 5 mL·20 μm/ (m²·day·atm), further preferably 2 mL·20 μm/(m²·day·atm), particularly preferably less than or equal to 1 mL·20 μm/ (m²·day·atm), from the viewpoint of gas barrier properties.

The oxygen permeability of the resin composition grows lower, more excellent barrier performance can be obtained even when the resin composition constitutes a multilayer structure. Here, for example, an oxygen permeability of "10 mL·20 μm/(m²·day·atm)" represents permeation of 10 mL of oxygen per 1 m² of a film having a thickness of 20 μm a day at a pressure difference of an oxygen gas of 1 atm.

The oxygen permeability of the resin composition at a temperature of 20° C. and a relative humidity of 100% is preferably less than or equal to 30 mL·20 μm/(m²·day·atm), more preferably less than or equal to 20 mL·20 μm/(m²·day·atm), further preferably less than or equal to 10 mL·20 μm/(m²·day·atm), particularly preferably less than or equal to 5 mL·20 μm/(m²·day·atm), from the viewpoint of gas barrier properties in a high humidity environment. The oxygen permeability of the resin composition grows lower, more excellent barrier performance can be obtained in a high humidity environment even when the resin composition constitutes a multilayer structure.

The oxygen permeability can be controlled by, for example, adjustment of stereoregularity of the PMAL (A), adjustment of the method of copolymerizing the PMAL (A), adjustment of the type of a copolymerization component, and adjustment of stretch orientation of the resin that is formed into a molding.

(Component (B))

The component (B) contained in the resin composition of the present invention needs to be at least one of an acid component and an anion of the acid component, and the acid component needs to have a logarithmic value pKa of a reciprocal of an acid dissociation constant at 25° C. of 3.5 to 7.5. The anion of the acid component is one from which a hydrogen ion is desorbed from the acid component. Addition of the component (B) that is an acid component having a pKa in this range can remarkably improve the thermal stability (coloring resistance and long-run properties) of the resin composition and a molding obtained from the resin composition of the present invention. From the viewpoint of improving the thermal stability, a lower limit value of the pKa is preferably 4.0, more preferably 4.4, and an upper limit value of the pKa is preferably 7.0, more preferably 6.5, further preferably 6.0. The pKa referred to herein indicates any one of a plurality of pKas when the component (B) includes a polybasic acid or anions of the polybasic acid. That is, when the component (B) has a plurality of pKas, any one of the pKas should be in the above ranges. An anion of the polybasic acid is one from which at least one of hydrogen ions of the polybasic acid is desorbed.

As the component (B), only one kind may be used alone, or two or more kinds may be used in combination. The use of two or more kinds in combination include cases where the component (B) contains one acid and also contains, in addition to the acid, an anion component constituting the acid. However, when the component (B) contains both an acid and an anion, the anion is not necessarily the same anion as the anion constituting the acid and may be a different anion.

The component (B) may be an organic acid or an anion of the organic acid, or may be an inorganic acid or an anion of the inorganic acid. As the component (B), however, preferably used is at least one of an organic acid and an anion of the organic acid, more preferably used is at least one selected from the group consisting of a carboxylic acid, an amino acid, a sulfonic acid, and an anion of these acids, and further preferably used is at least one of a carboxylic acid and an anion of the carboxylic acid. Further, the component (B) may be a polybasic acid or an anion of the polybasic acid, or may be a monobasic acid or an anion of the monobasic acid. The basicity of the polybasic acid, however, is preferably less than or equal to 3, more preferably less than or equal to 2, further preferably 1 (monobasic acid). The use of the component (B) that is a polybasic acid having a large basicity is likely to reduce an effect of improving the thermal stability and sometimes causes gelation of the resin composition.

Specific examples of the acid include:

monobasic acids such as formic acid, acetic acid, propionic acid, butyric acid, isobutyric acid, valeric acid, isovaleric acid, pivalic acid, lauric acid, myristic acid, palmitic acid, stearic acid, acrylic acid, propionic acid, methacrylic acid, crotonic acid, isocrotonic acid, oleic acid, elaidic acid, caproic acid, lactic acid, sorbic acid, capric acid, benzoic acid, and 2-naphthoic acid;

dibasic acids such as oxalic acid, malonic acid, succinic acid, glutaric acid, adipic acid, pimelic acid, suberic acid, azelaic acid, sebacic acid, maleic acid, fumaric acid, citraconic acid, mesaconic acid, malic acid, tartaric acid, mucic acid, tartronic acid, 2-ketoglutaric acid, 3-ketoglutaric acid, phthalic acid, isophthalic acid, terephthalic acid, oxaloacetic acid, citramalic acid, and phosphonic acid;

tribasic acids such as citric acid, isocitric acid, aconitic acid, and phosphoric acid;

tetrabasic acids such as 1,2,3,4-butanetetracarboxylic acid and ethylenediaminetetraacetic acid; and amino acids such as aspartic acid, glutamic acid, and 2-aminoadipic acid. The acid, however, is not limited to these examples. These acids may have a hydroxyl group or a halogen atom.

Specific examples of the anion contained in the component (B) include an anion of the acids described above, or the anion may form a salt with a counter cation in the resin composition. The counter cation can be, for example, a metal ion (C) described below.

A lower limit value of a content of the component (B) in the resin composition is 0.01 μmol, preferably 0.1 μmol, more preferably 0.2 μmol, per 1 g of the PMAL (A). An upper limit value of the content is not particularly limited from the viewpoint of significantly improving the thermal stability (coloring resistance and/or long-run properties), and may be, for example, 300 μmol, 200 μmol, 150 μmol, 100 μmol, or 50 μmol, preferably 35 μmol, more preferably 25 μmol, further preferably 17 μmol, per 1 g of the PMAL (A). In cases where the content of the component (B) is less than 0.01 μmol per 1 g of the PMAL (A), the improvement of the thermal stability cannot be recognized. In addition, in cases where the content of the component (B) is excessively large, the thermal stability is deteriorated.

(Metal Ion (C))

The resin composition preferably further contains a cation, or a metal ion (C). Addition of the metal ion (C) can improve interlayer adhesiveness of a molding as a multilayer structure, so that durability of the molding can be improved. A reason why the metal ion (C) improves the interlayer adhesiveness is not altogether clear. However, for example, in cases where a material that constitutes a layer adjacent to a layer containing the resin composition of the present invention has in the molecule a functional group that can react with a hydroxy group of the PMAL (A) to form a bond, presence of the metal ion (C) is considered to accelerate the reaction of forming the bond. Further, the addition of the metal ion (C) is also advantageous to improve the thermal stability (coloring resistance and/or long-run properties).

As the metal ion (C), only one kind may be used alone, or two or more kinds may be used in combination. The metal ion (C) is not particularly limited, and is, for example, an alkali metal ion, an alkaline-earth metal ion, and a transition metal ion, and preferably contains at least either one of an alkali metal ion and an alkaline-earth metal ion. Especially, the metal ion (C) more preferably contains an alkali metal ion from the viewpoint of improving the long-run properties and suppressing variety in thermal stability among resin compositions during production.

Examples of the alkali metal ion include an ion of lithium, sodium, potassium, rubidium, and cesium, and an ion of sodium or potassium is preferable in terms of industrial acquisition.

Examples of the alkaline-earth metal ion include an ion of beryllium, magnesium, calcium, strontium, and barium, and an ion of magnesium or calcium is preferable in terms of industrial acquisition.

The metal ion (C) may form a salt with a counter anion in the resin composition. Examples of the counter anion include an anion of the acids described above as the component (B).

A lower limit value of a content of the metal ion (C) in the resin composition is preferably 0.05 μmol, more preferably 0.5 μmol, further preferably 2.5 μmol, per 1 g of the PMAL (A). An upper limit value of the content can be 1000 μmol and is preferably 500 μmol, more preferably 150 μmol, further preferably 45 μmol, furthermore preferably 40 μmol, particularly preferably 28 μmol, most preferably 22 μmol, per 1 g of the PMAL (A). Addition of the metal ion (C) to the resin composition in the above ranges can improve the interlayer adhesiveness of a molding as a multilayer structure and can also further improve the thermal stability. In cases where the content of the metal ion (C) is less than 0.05 μmol per 1 g of the PMAL (A), effects of improving the interlayer adhesiveness and the thermal stability are likely to be insufficient. In addition, in cases where the content of the metal ion (C) exceeds 45 μmol, the effect of improving the thermal stability that is brought about by addition of the component (B), particularly the effect of improving the coloring resistance is deteriorated to possibly deteriorate appearance characteristics of a molding.

(Other Component (D))

The resin composition can contain one other component than the PMAL (A), the component (B), and the metal ion (C), as necessary. Examples of the other component include additives such as an antioxidant, an ultraviolet absorber, a plasticizer, an antistatic agent, a non-metal-containing thermal stabilizer, a lubricant, a coloring agent, a filler, another polymer compound (e.g., another thermoplastic resin), and a solvent (water or various kinds of organic solvents). One or two or more of these additives can be blended without inhibiting the function effects of the present invention. The usage of the other polymer compound is normally less than or equal to 50 mass %, preferably less than or equal to 20 mass % relative to the content of the PMAL (A).

<Method of Producing Resin Composition>

The resin composition according to the present invention can be suitably produced by a method including, in the following order, the following steps of:

[a] producing the PMAL (A) (hereinafter, also referred to as "step [a]"); and

[b] mixing the PMAL (A) obtained with the component (B) (hereinafter, also referred to as "step [b]").

When the resin composition is produced that contains the metal ion (C) or the other component (D), the component(s) to be added may be mixed in addition to the component (B) in step [b]. According to the method of mixing the component (B), and the metal ion (C) or the other component (D) that are to be added as necessary after the producing of the PMAL (A), a resin composition can be reliably produced that is excellent in thermal stability and further in interlayer adhesiveness.

Drying (hereinafter, also referred to as "step [c]") may also be provided as necessary after step [b]. Hereinafter, each of the steps is described in detail.

(Step [a])

For the production of the PMAL (A) in the present step, various methods can be used. Although the production method is not particularly limited, the following first to third methods can be provided as examples of a main production method.

[A-1] First Method

A method of homopolymerizing a monomer represented by the following formula (2) or copolymerizing the monomer in combination with the copolymerization components described above, and then reducing the resultant polymer or copolymer.

[Chemical Formula 3]

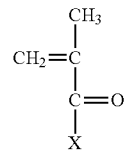

(2)

(In the formula, X represents an alkoxyl group, a hydroxy group, a halogen atom, or a hydrogen atom.)

Specific examples of the monomer represented by the formula (2) include methacrylic acid, a methacrylic halide, methacrylic acid esters such as methyl methacrylate, and methacrolein.

The homopolymerization of the monomer represented by the formula (2) and the copolymerization of the monomer in combination with the copolymerization components described above can be performed by known polymerization methods such as radical polymerization and anionic polymerization. As a radical polymerization initiator, there can be provided as examples azo initiators such as 2,2'-azobisisobutyronitrile, 2,2'-azobis(2,4'-dimethylvaleronitrile), and 2,2'-azobis(4-methoxy-2,4-dimethylvaleronitrile); and peroxide initiators such as isobutyl peroxide, di-n-propyl peroxydicarbonate, and t-butyl peroxypivalate. A polymerization temperature is normally about room temperature to 100° C.

As an anionic polymerization initiator, there can be used basic alkali metal or alkaline-earth metal derivatives such as butyllithium, lithium aluminum hydride, methylmagnesium bromide, ethylmagnesium chloride, and triphenylmethyl calcium chloride. The anionic polymerization is normally performed at about −100° C. to room temperature in an aprotic solvent such as tetrahydrofuran, dimethoxyethane, or diethyl ether.

As a method of reducing the obtained polymer or copolymer, there can be provided as examples a method of using, as a reducing agent, a metallic hydride such as lithium aluminum hydride, sodium borohydride, lithium borohydride, or diborane; and a method of adding hydrogen through a transition metal (e.g., ruthenium, rhodium, nickel, palladium, or platinum)-based catalyst. A solvent for a reduction reaction is appropriately selected in view of solubility of the polymer or the copolymer and reactivity of the polymer or the copolymer with a reducing agent. Specific examples of the solvent include tetrahydrofuran, N-methylmorpholine, dimethylacetamide, dimethylformamide, dimethyl sulfoxide, dimethoxyethane, methanol, ethanol, and propanol. A temperature of the reduction reaction is normally about room temperature to 200° C., preferably 50 to 150° C. When a syndiotactic or isotactic polymer or copolymer is reduced, a reduced polymer (PMAL (A)) can be obtained that maintains its original stereoregularity.

[A-2] Second Method

A method of homopolymerizing methallyl alcohol represented by the following formula (3) or copolymerizing the methallyl alcohol in combination with the copolymerization components described above.

[Chemical Formula 4]

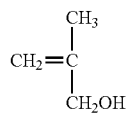

(3)

The hydrogen atom of the hydroxy group in the formula (3) may be substituted by an acyl group. In this case, a saponification reaction after the polymerization can give the PMAL (A) having a structural unit represented by the formula (1). For the polymerization of the methallyl alcohol, there can be used, for example, methods described in the specifications of U.S. Pat. Nos. 3,285,897, 3,666,740, JP 47-40308 B corresponding to U.S. Pat. No. 3,666,740, and GB 854,207.

[A-3] Third Method

A method of homopolymerizing a monomer represented by the following formula (4) or copolymerizing the monomer in combination with the copolymerization components described above, and then chemically converting the halogen atom Z into a hydroxy group.

[Chemical Formula 5]

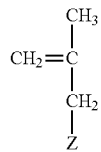

(4)

(In the formula, Z represents a halogen atom.)

For this method, there can be used, for example, a method described in the specification of U.S. Pat. No. 4,125,694.

The obtained PMAL (A) can be subjected to the next step after a post-treatment of, for example, removing or refining a used solvent (e.g., a reaction solvent or a solvent such as water used in a post-treatment), or at least a part of a post-treatment may be omitted, so that the obtained PMAL (A) is subjected to the next step, for example, in a state of containing a solvent.

(Step [b])

After the production of the PMAL (A), the PMAL (A) is mixed with the component (B) in the present step. When the resin composition is produced that contains the metal ion (C) or the other component (D), it is preferable to mix the PMAL (A) with, in addition to the component (B), the component to be added in the present step. Examples of the mixing method include (I) a method of contacting the PMAL (A) with a liquid containing the component (B);

(II) a method of adding a liquid containing the component (B) to the PMAL (A) melted; and (III) a method of dry-blending the PMAL (A) with the component (B).

The methods (I) and (II) may be applied in combination by, for example, using the method (I) for the mixing of the component (B) and the metal ion (C) and the method (II) for the mixing of the other component (D).

Specifically, the mixing by the method (I) can be performed by immersing the PMAL (A) in a liquid containing the component (B). When the resin composition is produced that contains the metal ion (C) or the other component (D), the metal ion (C) or the other component (D) can be added to a liquid containing the component (B). As described above, however, the method (II) described below may also be used to add the metal ion (C) or the other component (D) to the resin composition.

The immersion in a liquid containing the component (B) may be performed by a batch or continuous technique. When the batch technique is performed, the mass ratio (bath ratio) of the liquid containing the component (B) to the PMAL (A) (when another component such as a solvent is contained, the amount except the other component) is preferably greater than or equal to 3, more preferably greater than or equal to 10, further preferably greater than or equal to 20. For the continuous technique, a column apparatus can be suitably used. A suitable range of an immersion period varies according to the form of the PMAL (A) subjected to the present step. However, when the PMAL (A) is grains having an average diameter of about 1 to 10 mm, the immersion period can be greater than or equal to 1 hour and is preferably greater than or equal to 2 hours.

Specifically, the mixing by the method (II) can be performed by melt-kneading the PMAL (A) and the liquid containing the component (B) in an extruder. When the resin composition is produced that contains the metal ion (C) or the other component (D), the metal ion (C) or the other component (D) can be added to the liquid containing the component (B).

A temperature during melting of the PMAL (A) is preferably about 100 to 300° C. A temperature exceeding 300° C. may possibly cause a thermally deteriorated or decomposed PMAL (A). A water-containing PMAL (A) has a lower melting point than that of a dry PMAL (A), allowing melting at a lower temperature. A temperature of less than 100° C. sometimes makes melting of the PMAL (A) difficult.

Not only a twin screw extruder but also other apparatuses can be used for the melt-kneading of the PMAL (A) and the component (B) as long as the melt-kneading can be performed.

When two or more components are mixed with the PMAL (A) by the method (I) or (II) (for example, when the component (B) and the metal ion (C) are mixed with the PMAL (A) or when the component (B) containing two or more kinds is mixed with the PMAL (A)), a liquid brought into contact with or added to the PMAL (A) may be arranged as a plurality of liquids each containing a component alone or as a liquid containing two or more components (for example, a liquid containing all components to be mixed).

A solution used in the method (I) or (II) may be prepared by separately adding to a solvent components to be added to the resin composition or may be prepared by adding to a solvent a salt that is formed by a plurality of components to be added to the resin composition. Examples of the salt include a metal salt of an acid. In the metal salt of an acid, the cation can be the metal ion (C), and the anion can be the component (B). The concentration of each component in the solution may be appropriately adjusted so that the resin composition that can be obtained in the end has a desired content of the component. The solvent is not particularly limited, however, is preferably water for, for example, reasons of handling. In the solution, the component to be added to the resin composition is not necessarily dissolved, and the solution may be a dispersion liquid or a solution having the component dissolved therein.

It is also possible to dry-blend the PMAL (A) as it is, with the component to be added to the resin composition without dispersing or dissolving the component in a solvent, and then melt-knead the blended materials by the method (III). Mixing by addition or dry blending makes the obtained resin composition excellent in melt moldability.

(Step [c])

The resin composition obtained through step [b] can be used as it is as a material for a molding. It is preferable, however, to remove a solvent (e.g., water) and dry the resin composition in the present step. The content ratio of a solvent in the dried resin composition is preferably less than or equal to 1.0 mass %, more preferably less than or equal to 0.8 mass %, further preferably less than or equal to 0.5 mass % of the whole resin composition, from the view point of preventing molding troubles such as generation of voids due to, for example, foam formation during molding processing.

The drying method is not particularly limited, and suitable examples thereof include stationary drying and fluidized drying. A single drying method may be used or a plurality of methods may be combined, for example, by performing fluidized drying and then stationary drying. The drying may be either a continuous technique or a batch technique. When a plurality of drying techniques are combined, the continuous technique or the batch technique can be freely selected for each of the drying techniques. Drying in low oxygen concentration, in absence of oxygen, or in a nitrogen atmosphere is preferable in terms of reducing deterioration of the resin composition caused by oxygen during drying. Especially, drying in a nitrogen atmosphere is preferable.

<Molding>

A molding according to the present invention is one that contains the resin composition described above, more specifically one obtained by molding the resin composition described above. The molding method is not particularly limited, and there can be used various molding methods such as melt molding (e.g., extrusion molding, injection molding, and blow molding), solution molding, and powder molding. The molding method, however, is preferably melt molding. The resin composition of the present invention allows stable and long-term continuous production of molded bodies while suppressing coloring such as yellowing even when the molded bodies are produced by melt molding, and further, the resin composition of the present invention can improve the interlayer adhesiveness when formed into a molding as a multilayer structure, so that durability of the molding can be improved. Further, the molding according to the present invention has less fish eyes, streaks, gel, granules or the like, so that appearance characteristics other than coloring can also be excellent. The use of the resin composition of the present invention can also give a multilayer structure excellent in appearance characteristics, long-run properties, and interlayer adhesiveness. A temperature during melting of the resin composition in melt molding is preferably about 100 to 300° C. A temperature exceeding 300° C. may possibly cause a thermally deteriorated or decomposed PMAL (A) in the resin composition. A temperature of less than 100° C. sometimes makes melting of the resin composition difficult.

The molding according to the present invention is excellent in gas barrier properties to be suitable for use application that takes advantage of such properties, and a representative example of the use application is a packing material (including a packing container). The shape/form of the molding is not particularly limited, and examples of the shape/form include a single-layered or multilayered film, a sheet, a pipe, a tube, a container (e.g., a deep-drawn container, a bottle, a cup, a tank, a pouch, and a bag), and a fiber. The molding having a shape/form other than a film or a sheet may also have a single layer or multilayer structure. The packing material according to the present invention can be suitably used as, for example, a packing material for food or medicine.

Specific examples of the molding according to the present invention preferably include a single layer structure that includes at least one layer containing the resin composition described above (suitably a layer made from the resin composition described above) and that includes only the layer containing the resin composition; a multilayer structure that includes at least one layer containing the resin composition and at least one other layer different from the layer; and a multilayer structure that includes at least two layers containing the resin composition and does not include any other layer.

As a suitable layer structure of the multilayer structure, there can be provided as examples P/T, T/P/T, P/Ad/T, and T/Ad/P/Ad/T when a layer containing the resin composition according to the present invention described above is defined as P, a layer made from an adhesive resin (adhesive resin layer) as Ad, and a layer made from a thermoplastic resin (thermoplastic resin layer) as T. These layers may be a single layer or a multilayer. An adhesive agent layer can also be interposed in place of the adhesive resin layer.

A method of producing the multilayer structure is not particularly limited, and examples of the method include:

i) a method of melt-extruding a thermoplastic resin onto the layer P (e.g., a film and a sheet) to form the thermoplastic resin layer T on the layer P;

ii) a method of co-extruding or co-injecting the resin composition according to the present invention and another thermoplastic resin to form a P/T or T/P/T layer structure; and iii) a method of laminating the layer P and the thermoplastic resin layer T (e.g., a film and a sheet) with the adhesive resin layer Ad or the adhesive agent layer interposed between the layer P and the thermoplastic resin layer T. When the adhesive resin layer Ad is used, the multilayer structure can also be produced by co-extrusion or co-injection in the same manner as in the method ii), and another base material (e.g., a film and a sheet) can also be used in place of the thermoplastic resin T.

As the thermoplastic resin used for the other layer in the multilayer structure, there can be provided as examples a homopolymer or a copolymer of olefins such as linear low-density polyethylene, low-density polyethylene, medium-density polyethylene, high-density polyethylene, an ethylene-vinyl acetate copolymer, an ethylene-propylene copolymer, polypropylene, a propylene-α-olefin copolymer (α-olefin having 4 to 20 carbon atoms), polybutene, and polypentene; an ethylene-vinyl alcohol copolymer; polyesters such as polyethylene terephthalate; a polyester elastomer; polyamides such as Nylon 6 and Nylon 66; polystyrene; polyvinyl chloride; polyvinylidene chloride; a (meth) acrylic resin; a vinyl ester resin; a polyurethane elastomer; polycarbonate; chlorinated polyethylene; and chlorinated polypropylene. In particular, preferably used are polyethylene, an ethylene-vinyl acetate copolymer, an ethylene-propylene copolymer, polypropylene, polyesters, polyamides, and polystyrene.

The adhesive resin that forms the adhesive resin layer Ad is not particularly limited as long as the adhesive resin has adhesiveness to the resin composition of the present invention and the thermoplastic resin. The adhesive resin, however, is preferably an adhesive resin containing a carboxylic acid-modified polyolefin. As the carboxylic acid-modified polyolefin, there can be suitably used a carboxyl group-containing modified olefin polymer obtained by chemically (e.g., an addition reaction and a graft reaction) bonding an olefin polymer with an ethylenic unsaturated carboxylic acid, or an ester or an anhydride thereof. The olefin polymer referred to herein means polyolefins such as polyethylene (low pressure, medium pressure, and high pressure), linear low-density polyethylene, polypropylene, and polybutene; and a copolymer (e.g., an ethylene-vinyl acetate copolymer and an ethylene-acrylic acid ethyl ester copolymer) of an olefin with another monomer (e.g., vinyl ester and an unsaturated carboxylic acid ester). In particular, preferred are linear low-density polyethylene, an ethylene-vinyl acetate copolymer (content of vinyl acetate 5 to 55 mass %), an ethylene-acrylic acid ethyl ester copolymer (content of acrylic acid ethyl ester 8 to 35 mass %), and more preferred are linear low-density polyethylene and an ethylene-vinyl acetate copolymer. As the ethylenic unsaturated carboxylic acid, or an ester or an anhydride thereof, there can be provided as examples an ethylenic unsaturated monocarboxylic acid or an ester thereof; and an ethylenic unsaturated dicarboxylic acid, or a monoester, a diester, or an anhydride thereof. In particular, an ethylenic unsaturated dicarboxylic acid anhydride is preferable. Specific examples include maleic acid, fumaric acid, itaconic acid, maleic acid anhydride, itaconic acid anhydride, maleic acid monomethyl ester, maleic acid monoethyl ester, maleic acid diethyl ester, and fumaric acid monomethyl ester. Particularly, maleic acid anhydride is suitable.

As an adhesive agent that forms the adhesive agent layer, there can be used known adhesive agents having, as an adhesive agent component, for example, an organic titanium compound, an isocyanate compound, and a polyester compound.

Among the methods i) to iii), preferably used is a method of co-extruding the resin composition according to the present invention and another thermoplastic resin. The co-extrusion method is not particularly limited, and examples thereof include a multimanifold-merging T die method, a feedblock-merging T die method, and an inflation method.

The multilayer structure may be subjected to secondary processing to give a molding. The shape/form of the molding obtained through the secondary processing is not particularly limited, and representative molded bodies are as follows.

a) A multilayer stretched sheet or film obtained by uniaxially or biaxially stretching the multilayer structure (e.g., a sheet and a film) and subjecting the stretched multilayer structure to a heat treatment;

b) A multilayer rolled sheet or film obtained by rolling the multilayer structure (e.g., a sheet and a film);

c) A multilayer tray cup-shaped container obtained by subjecting the multilayer structure (e.g., a sheet and a film) to thermal molding processing such as vacuum molding, pressure molding, or vacuum pressure molding; and d) A bottle or cup-shaped container or the like obtained by subjecting the multilayer structure (e.g., a pipe) to, for example, stretch blow molding.

The secondary processing method is not limited to the methods exemplified to obtain the above molded products, and, for example, there can be appropriately used a known secondary processing method other than the above methods, such as blow molding.

<Use Application>

The multilayer structure of the present invention is more specifically described with regard to its use application. The multilayer structure of the present invention can be applied to, for example, a packing material. The packing material of the present invention includes the multilayer structure, and may consist of only the multilayer structure of the present invention or may also consist of the multilayer structure and another member. The packing material can be manufactured by various methods. For example, a sheet-shaped multilayer structure or a film material including the multilayer structure (hereinafter, also simply referred to as a "film material") is joined to mold a predetermined container shape, so that a container (packing material) may be manufactured. The packing material including the multilayer structure of the present invention can be applied to various use applications, taking advantage of excellent gas barrier properties and water vapor barrier properties of the packing material. The packing material is preferable for use application where barrier properties against oxygen are necessary or use application where the packing material is internally substituted by various functional gases. For example, the packing material according to the present invention is preferably used as a packing material for food. Further, the packing material according to the present invention is preferably used, in addition to as a packing material for food, as a packing material for packing chemicals such as an agricultural chemical and a drug; a medical device; industrial materials such as a machine part and a precision material; and clothes. The multilayer structure of the present invention may also be used for electronic devices such as a solar battery and a display. For example, when used for a solar battery, the multilayer structure of the present invention is used as a member of the solar battery. Alternatively, when used for a display, the multilayer structure of the present invention is used as a member of the display.

The multilayer structure and the packing material of the present invention may be subjected to secondary processing to give various molded products. Such molded products may be a vertically-made, filled, and sealed bag, a pouch, a vacuum insulator, a vacuum packing bag, a bottle, a cup-shaped container, a tank, a bag, a laminated tube container, an infusion bag, a container lid, a paper container, a strip tape, or an in-mold label.

(Vertically-Made, Filled, and Sealed Bag)

The packing material including the multilayer structure of the present invention may be a vertically-made, filled, and sealed bag. FIG. 1 shows one example. A vertically-made, filled, and sealed bag 10 shown in FIG. 1 is formed by sealing a multilayer structure 11 at three ends including two edges 11a and a body 11b. Vertically-made, filled, and sealed bag 10 can be produced by a vertical bag making and filling machine. Various methods are applied for production of a bag by the vertical bag making and filling machine. In any methods, however, a material to be a content is supplied into the bag from an upper opening of the bag, and then the opening is sealed to produce a vertically-made, filled, and sealed bag. The vertically-made, filled, and sealed bag consists of one film material heat-sealed at, for example, three ends including an upper edge, a lower edge, and a side. The vertically-made, filled, and sealed bag as a container, according to the present invention, is excellent in gas barrier properties and water vapor barrier properties, and the barrier performance is maintained even after a retort treatment, so that quality deterioration of a content can be suppressed over a long period of time by the vertically-made, filled, and sealed bag.

(Pouch)

Figure 2:
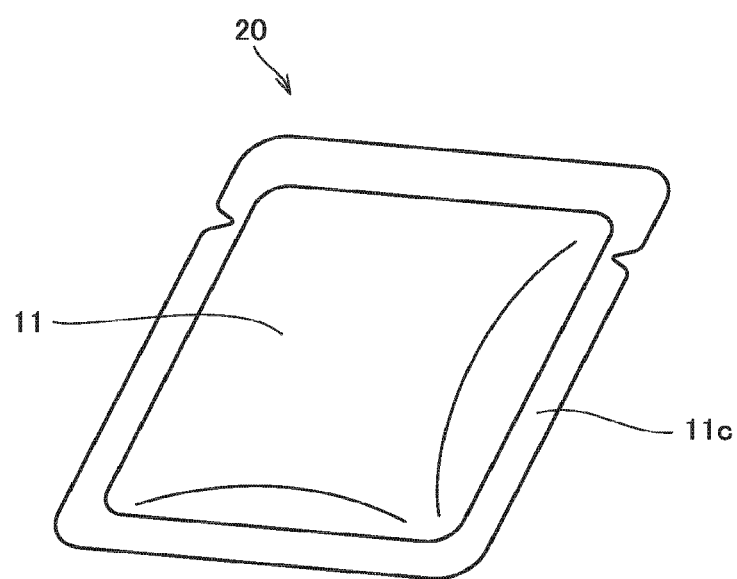
FIG. 2 is a schematic view of a flat pouch according to one embodiment of a multilayer structure (packing material) of the present invention.

The packing material including the multilayer structure of the present invention may be a pouch. The "pouch" in the present specification means a container that mainly has food, daily commodities, or medicine as a content and that has a film material as a wall member. Examples of the pouch include, in terms of its shape and use application, a spout pouch, a zipper-sealed pouch, a flat pouch, a stand-up pouch, a horizontally-made, filled, and sealed pouch, and a retort pouch. FIG. 2 shows one example. A flat pouch 20 shown in FIG. 2 is formed by mutually joining two multilayer structures 11 at their peripheries 11c. The pouch may be formed by laminating a barrier multilayer structure and at least one other layer. The pouch of the present invention is excellent in gas barrier properties and maintains its barrier performance even after a retort treatment. Therefore, the use of the pouch can prevent alteration of a content over a long period of time even after transportation or long storage. Further, in one example of the pouch, transparency can be excellently held to facilitate confirmation of a content or confirmation of deterioration-related alteration of a content.

(Vacuum Insulator)

Figure 3:
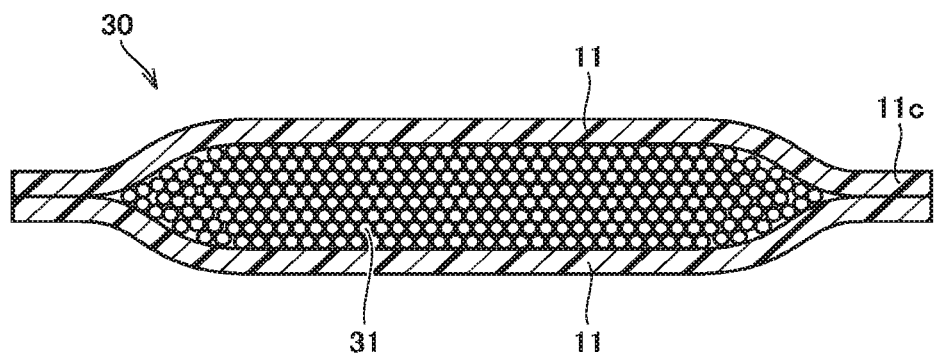
FIG. 3 is a sectional view of a vacuum insulator according to one embodiment of a multilayer structure of the present invention.

The multilayer structure of the present invention can also be used for a vacuum insulator. FIG. 3 shows one example. A vacuum insulator 30 in FIG. 3 includes two multilayer structures 11 as covering materials and a core material 31, two multilayer structures 11 are mutually joined at peripheries 11c, and core material 31 is disposed in multilayer structures 11 surrounding the core material, and the inside of the vacuum insulator is depressurized. Multilayer structures 11 are firmly attached to core material 31 due to pressure difference between the inside and the outside of vacuum insulator 30. Vacuum insulator 30 may be used after formed in such a manner that one multilayer structure is used as a covering material, core material 31 is disposed so as to be included in the multilayer structure, and the multilayer structure is folded and heat-sealed at its edge. The material and the shape of core material 31 are not particularly limited as long as the material and the shape are appropriate for thermal insulation. Examples of core material 31 include a pearlite powder, a silica powder, a precipitated silica powder, diatomaceous earth, calcium silicate, glass wool, rock wool, artificial (synthetic) wool, and resin foam (e.g., styrene foam and urethane foam). As core material 31, there can also be used, for example, a hollow container molded in a predetermined shape and a honeycomb structure, and the core material may also be particulate.

The vacuum insulator of the present invention that is thinner and lighter than a urethane foam insulator can achieve thermal insulation characteristics equivalent to thermal insulation characteristics of the urethane foam insulator. The vacuum insulator of the present invention can hold an insulation effect over a long period of time, so that the vacuum insulator can be used for, for example, an insulation material of home electric appliances such as a refrigerator, hot-water supply equipment, and a rice cooker; a residential insulation material used in, for example, a wall, a ceiling, an attic, and a floor; an insulation panel of, for example, a vehicle sealing material, a heat storage device, and a vending machine; and a heat transfer device such as a heat pump-applied device.

(Electronic Device)

The multilayer structure of the present invention is excellent not only in gas barrier properties but also in water vapor barrier properties. Particularly, when the multilayer structure of the present invention is used for an electronic device, these properties sometimes largely contribute to durability of the electronic device. Examples of the electronic device include photoelectric converters such as a solar battery; an information display device having a display such as an organic EL display, a liquid crystal display (LCD), or an electronic paper; and lamps such as an organic EL light-emitting element. Examples of the solar battery include a silicon solar battery, a compound semiconductor solar battery, and an organic thin film solar battery. Examples of the silicon solar battery include a single crystal silicon solar battery, a polycrystalline silicon solar battery, and an amorphous silicon solar battery. Examples of the compound semiconductor solar battery include a group-III-V compound semiconductor solar battery, a group-II-VI compound semiconductor solar battery, and a group-I-III-VI compound semiconductor solar battery. Examples of the organic thin film solar battery include a pn heterojunction organic thin film solar battery and a bulk heterojunction organic thin film solar battery. The solar battery may also be an integrated solar battery having a plurality of unit cells connected in series.

Examples of the multilayer structure used for an electronic device include electronic device-related members such as display members including an LCD substrate film, an organic EL display substrate film, an electronic paper substrate film, an electronic device sealing film, and a PDP film; an LED film; an IC tag film; and solar battery members including a solar battery module, a solar battery back sheet, and a solar battery protective film; an optical communication member; an electronic device flexible film; a fuel battery diaphragm; a fuel battery sealing film; and a substrate film for various functional films. When used as a member of a display, the multilayer structure is used as, for example, a low reflection film.

Figure 4:
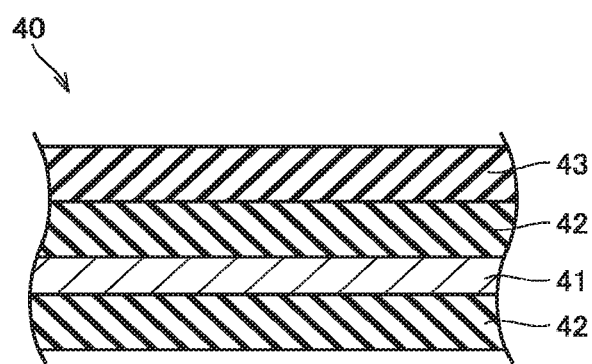
FIG. 4 is a partial sectional view of an electronic device according to one embodiment of a multilayer structure of the present invention.

FIG. 4 shows a partial sectional view of one example of an electronic device including the multilayer structure of the present invention. An electronic device 40 shown in FIG. 4 includes an electronic device main body 41, a sealing member 42, and a protective sheet (multilayer structure) 43, and protective sheet 43 is disposed so as to protect a surface of electronic device main body 41. Protective sheet 43 may be disposed directly on one surface of electronic device main body 41 or may be disposed on electronic device main body 41 with another member such as sealing member 42 interposed between the protective sheet and the electronic device main body. Protective sheet 43 includes the multilayer structure of the present invention. Protective sheet 43 may consist of only the multilayer structure or may include the multilayer structure and another member (e.g., another layer) laminated on the multilayer structure. Protective sheet 43 is not particularly limited as to its thickness and material as long as the protective sheet is a layered laminate suitable for protecting the surface of the electronic device and includes the multilayer structure described above. Sealing member 42 may cover the whole surface of electronic device main body 41. Sealing member 42 is an optional member that is appropriately added in accordance with, for example, the type and the use application of electronic device main body 41. As sealing member 42, for example, an ethylene-vinyl acetate copolymer or polyvinyl butylal is used. Protective sheet 43 may also be disposed on a surface opposite from the surface having protective sheet 43 disposed thereon.

Electronic device main body 41 can be manufactured by a so-called roll-to-roll technique depending on the type of the electronic device main body. In the roll-to-roll technique, a flexible substrate (e.g., a stainless substrate and a resin substrate) wound around a feeding roll is fed and an element is formed on the substrate to manufacture electronic device main body 41, and electronic device main body 41 obtained is wound around a winding roll. In this case, it is desirable to prepare protective sheet 43 in a form of a flexible long sheet, more specifically in a form of a wound body of a long sheet. In one example, protective sheet 43 fed from the feeding roll is laminated on electronic device main body 41 before the electronic device main body is wound around the winding roll, and the protective sheet is wound together with electronic device main body 41. In another example, electronic device main body 41 wound around the winding roll may be fed again from the roll for lamination of protective sheet 43. In one preferable example of the present invention, the electronic device itself is flexible.

EXAMPLES

Hereinafter, the present invention is more specifically described by way of examples; however, the present invention is not to be limited by the examples. In the following production examples, examples, and comparative examples, "part" and "%" mean "part by mass" and "mass %," respectively, unless otherwise specified. A measuring method and an evaluation method were performed according to the following methods.

[1] Measurement of Water Content of Water-Containing PMAL

With use of the halogen moisture analyzer "HR73" manufactured by Mettler-Toledo International Inc., the water content of a water-containing PMAL was measured under the conditions of a dry temperature of 180° C., a dry period of 20 minutes, and a sample amount of about 10 g. The water content of the water-containing PMAL that is indicated below is represented by mass % based on the mass of the PMAL dried, and was calculated by the following equation:

Water content (mass %)={(Mass of water-containing PMAL−Mass of dried PMAL)/(Mass of dried PMAL)}×100

[2] Identification of Structure of PMAL (A)

A resin composition was pulverized by frost shattering and sieved with a sieve having a nominal size of 1 mm (in accordance with standard specifications of a sieve JIS Z 8801). A powder of the resin composition that passed through the sieve in an amount of 5 g was immersed in 100 g of ion-exchanged water and stirred at 70° C. for 4 hours, and then an operation of dehydrating and drying was performed twice, and drying was performed by a vacuum drier at 80° C. for 48 hours. The obtained powder was subjected to $^1$H-NMR measurement and $^{13}$C-NMR measurement under the following measurement conditions, and the structure of PMAL-1 in Production Example 1 described below was identified from a ratio of peak strength ($I_1:I_2:I_3$, $I_5:I_6:I_7:I_8$) obtained under the following measurement conditions and degree of progress of a reduction reaction $[(I_3/2)/\{(I_3/2)+(I_4/3)\}]\times100$.

($^1$H-NMR Measurement Conditions)
Observation frequency: 600 MHz
Solvent: DMSO-$d_6$
Polymer concentration: 5 mass %
Measurement temperature: 80° C.
Cumulative number: 512
Pulse delay time: 2.8 sec
Sample rotational speed: 10-12 Hz
Pulse width (90° pulse): 15 μsec ($^{13}$C-NMR Measurement Conditions)
Observation frequency: 150 MHz
Solvent: DMSO-$d_6$
Polymer concentration: 10 mass %
Measurement temperature: 80° C.
Cumulative number: 8000
Measurement mode: Inverse gated decoupling method
Pulse delay time: 1.2 sec
Sample rotational speed: 10-12 Hz
Pulse width (90° pulse): 16 μsec (Analysis Method)

From a $^1$H-NMR spectrum were obtained a peak integral value ($I_1$) of 0.9 to 1.2 ppm, a peak integral value ($I_2$) of 1.2 to 1.6 ppm, a peak integral value ($I_3$) of 3.1 to 3.5 ppm, and a peak integral value ($I_4$) of 3.5 to 3.7 ppm. Here, the peak of 0.9 to 1.2 ppm is derived from methyl on a side chain, the peak of 1.2 to 1.6 ppm is derived from methylene on the main chain, the peak of 3.1 to 3.5 ppm is derived from methylene on a side chain, and the peak derived from 3.5 to 3.7 ppm is derived from methyl of polymethyl methacrylate, a methyl ester. From these integral values are calculated the structure and the degree of progress of a reduction reaction of the PMAL by the following equation. In the meantime, a peak of hydrogen of a hydroxy group was observed around 4.6 ppm that was not used for analysis.

Further, from a $^{13}$C-NMR spectrum were obtained a peak integral value ($I_5$) of 21 to 27 ppm, a peak integral value ($I_6$) of 38 to 43 ppm, a peak integral value ($I_7$) of 43 to 52 ppm, and a peak integral value ($I_8$) of 67 to 73 ppm. Here, the peak of 21 to 27 ppm is derived from a primary carbon atom on a side chain, the peak of 38 to 43 ppm is derived from a quaternary carbon atom on the main chain, the peak of 43 to 52 ppm is derived from a secondary carbon atom on the main chain, and the peak of 67 to 73 ppm is derived from a secondary carbon atom on a side chain having a hydroxy group bonded thereto.

[3] Quantitative Determination of Component (B)

A resin composition was pulverized by frost shattering and sieved with a sieve having a nominal size of 1 mm (in accordance with standard specifications of a sieve JIS Z 8801). A powder of the resin composition that passed through the sieve in an amount of 10 g and 50 mL of ion-exchanged water were charged into a stoppered 100-mL conical flask, a cooling condenser was attached to the flask, and the mixture was stirred at 95° C. for 10 hours and extracted to give an extraction liquid. The obtained extraction liquid in an amount of 2 mL was diluted with 8 mL of ion-exchanged water to give a diluted solution. The diluted solution was subjected to quantitative analysis by ion chromatography, and the amount of the component (B) was calculated. The measurement conditions were as follows, and quantitative determination was performed using a calibration curve prepared with use of each acid.

(Ion Chromatography Measurement Conditions)
Column: IonPac "ICE-AS-1" manufactured by Dionex Corporation
Eluent: 1.0 mmol/L octane sulfonic acid solution
Measurement temperature: 35° C.
Eluent flow rate: 1 mL/min
Amount used for analysis: 50 µL

[4] Quantitative Determination of Metal Ion (C)

The resin composition in an amount of 0.1 g was placed in a fluororesin pressure resistant container, and 5 mL of sulfuric acid for precise analysis was added. After the mixture was left to stand for 30 minutes, the container was lidded with a cap lip having a rupture disk, and the mixture was treated at 150° C. for 10 minutes and then at 220° C. for 30 minutes to decompose the resin composition. In cases where the decomposition of the resin composition was incomplete, the treatment conditions were appropriately adjusted to completely decompose the resin composition. The obtained decomposition product was diluted with 10 mL of ion-exchanged water, all the liquid was transferred to a 50-mL measuring flask, and the volume of the liquid was adjusted to 50 mL with ion-exchanged water, to give a decomposition solution.

The decomposition solution was subjected to quantitative analysis at the observation wavelengths indicated below with use of the ICP emission spectrophotometer "Optima 4300 DV" manufactured by PerkinElmer Japan Co., Ltd., to quantitatively determine the content of the metal ion (C).

Na: 589.592 nm
K: 766.490 nm
Mg: 285.213 nm
Ca: 317.933 nm

[5] Measurement of Weight Average Molecular Weight and Molecular Weight Distribution Measurement was performed with use of gel permeation chromatography (GPC), and a value was calculated in terms of a molecular weight of standard polymethyl methacrylate. Measurement conditions were as follows.

Device: LC-20AT manufactured by SHIMADZU CORPORATION
Detector: differential refractive index detector
Column: two columns (TSKgel AWM-M manufactured by Tosoh Corporation) connected together
Mobile phase: 10 mmol/L lithium bromide DMF solution
Flow rate: 0.5 mL/min
Column temperature: 40° C.

[6] Evaluation of Coloring Resistance

A multilayer film manufactured for evaluation of interlayer adhesiveness that is described below was wound around a paper tube, an edge surface of a layer made from the resin composition was visually observed, and evaluation of coloring resistance was performed on the basis of the following evaluation criteria.

A: not colored
B: slightly colored
C: pale yellowed
D: yellowed
E: badly colored exhibiting orange color

[7] Evaluation of Long-Run Properties

Evaluation of long-run properties was performed by measuring an MFR. After the resin composition was held in a melt indexer at a temperature of 210° C. and a load of 2160 g for 3 minutes, the resin composition was discharged for 1 minute, and the weight of the resin composition discharged at that time was measured as $MFR_3$. After the resin composition was held for 15 minutes in the same manner, the resin composition was discharged for 1 minute, and the weight of the resin composition discharged at that time was measured as $MFR_{15}$. A ratio $MFR_{15}/MFR_3$ of $MFR_{15}$ to $MFR_3$ was calculated, and the long-run properties were evaluated on the basis of the following evaluation criteria. The $MFR_{15}/MFR_3$ grows closer to 1, the more stable the melt viscosity is, indicating excellent long-run properties.

A: less than 1.2 and greater than or equal to 0.8
B: greater than or equal to 0.6 and less than 0.8, or greater than or equal to 1.2 and less than 1.4
C: greater than or equal to 0.4 and less than 0.6, or greater than or equal to 1.4 and less than 1.6
D: greater than or equal to 0.3 and less than 0.4, or greater than or equal to 1.6 and less than 1.7
E: greater than or equal to 0.2 and less than 0.3, or greater than or equal to 1.7 and less than 1.8
F: less than 0.2 or greater than or equal to 1.8

[8] Evaluation of Interlayer Adhesiveness

With use of the resin composition, linear low-density polyethylene (LLDPE: "ULTZEX 2022L" manufactured by Mitsui Chemicals, Inc.), and an adhesive resin ("Bondine TX8030" manufactured by SUMICA. ATOCHEM Co., Ltd., hereinafter also referred to as Ad), a 3-component 5-layer multilayer film (LLDPE/Ad/resin composition (PMAL)/Ad/LLDPE=thickness 50 µm/10 µm/10 µm/10 µm/50 µm) was manufactured by a multilayer film extruder under the following method and conditions. The obtained multilayer film was cut out in 150 mm in the MD direction and 15 mm in the TD direction directly after formation of the multilayer film and then was immediately measured for peel strength between the resin composition layer and the Ad layer by an autograph ("DCS-50M" manufactured by SHIMADZU CORPORATION) at T-type peeling, and interlayer adhesiveness was evaluated according to the peel strength on the basis of the following evaluation criteria.

A: greater than or equal to 300 g/15 mm
B: greater than or equal to 200 g/15 mm and less than 300 g/15 mm
C: greater than or equal to 100 g/15 mm and less than 200 g/15 mm
D: less than 100 g/15 mm (Conditions for Manufacturing Multilayer Film)
Extruder:
For resin composition: laboratory extruder 20 mmφ (ME type), CO-EXT (manufactured by Toyo Seiki Seisaku-sho, Ltd.)
For Ad: extruder 20 mmφ, SZW20GT-20MG-STD (manufactured by TECHNOVEL CORPORATION)
For LLDPE: extruder 32 mmφ, GT-32-A (manufactured by Research Laboratory of Plastics Technology Co., Ltd.)
Extrusion temperature for resin composition
  supply zone/compression zone/measuring zone/die=175/210/210/210° C.
Extrusion temperature for Ad
  supply zone/compression zone/measuring zone/die=100/160/220/220° C.
Extrusion temperature for LLDPE
  supply zone/compression zone/measuring zone/die=150/200/210/220° C.
Die 300 mm wide coat hanger die (manufactured by Research Laboratory of Plastics Technology Co., Ltd.)

[9] Evaluation of Gas Barrier Properties (Oxygen Permeability)

The multilayer film manufactured for evaluation of interlayer adhesiveness that has been described above was measured for oxygen permeability with use of an oxygen permeation measuring apparatus "MOCONOX-TRAN2/20 type" manufactured by MODERN CONTROLS INC. under the conditions of 20° C. and 100% RH and in accordance with a method stipulated in JIS K7126 (equal-pressure method), and evaluation of gas barrier properties was performed on the basis of the following evaluation criteria.

A: less than 10 mL/(m$^2$·day·atm)
B: greater than or equal to 10 mL/(m$^2$·day·atm) and less than 20 mL/(m$^2$·day·atm)
C: greater than or equal to 20 mL/(m$^2$·day·atm) and less than 40 mL/(m$^2$·day·atm)
D: greater than or equal to 40 mL/(m$^2$·day·atm) and less than 60 mL/(m$^2$·day·atm)
E: greater than or equal to 60 mL/(m$^2$·day·atm)

<Synthesis of Polymethyl Methacrylate>

Into a stirrer and collecting tube-equipped autoclave were charged 100 parts by mass of methyl methacrylate, 0.0053 parts by mass of 2,2'-azobis(2-methylpropionitrile), and 0.20 parts by mass of n-octyl mercaptan in a nitrogen atmosphere, and the mixture was stirred while nitrogen was blown into the autoclave to remove dissolved oxygen, so that a raw liquid was obtained. Next, the raw liquid was charged into a reaction tank connected to the autoclave via a pipe until the raw liquid fills ⅔ of the volume of the reaction tank, and first, a polymerization reaction was started by a batch technique while the temperatures was maintained at 140° C. When polymerization conversion reached 48 mass %, the raw liquid was supplied from the autoclave into the reaction tank at a flow rate so as to have an average residence time of 150 minutes, a reaction liquid was extracted from the reaction tank at a flow rate equivalent to the flow rate for supplying the raw liquid, and then the polymerization reaction was switched to a continuous flow technique while the temperature was maintained at 140° C. The polymerization conversion was 48 mass % in a static state after the switching.

The reaction liquid extracted from the reaction tank in a static state was supplied to a multitubular heat exchanger having an internal temperature of 230° C. at a flow rate so as to have an average residence time of 2 minutes and was heated. Then, the heated reaction liquid was introduced into an insulated flash evaporator, volatile matter was removed that contained unreacted monomers as a main component to give a molten resin. The molten resin having the volatile matter removed therefrom was supplied to a twin screw extruder having an internal temperature of 260° C., discharged in a strand shape and cut by a pelletizer to give pellet-shaped polymethyl methacrylate. As a result of GPC analysis, the obtained polymethyl methacrylate had a weight average molecular weight of 117000 and a molecular weight distribution of 2.35.

Production Example 1: Synthesis of PMAL

Lithium aluminum hydride in an amount of 250 parts was placed in a cooler-equipped reactor, the air in the reactor was replaced with nitrogen, 3000 parts of N-methylmorpholine were added, and then the mixture was heated to 130° C. and refluxed. To the mixture were added a solution containing 600 parts of the polymethyl methacrylate synthesized above and 6000 parts of N-methylmorpholine, and the mixture was further refluxed for 4 hours after the drop of the solution was completed. Thereafter, 1000 parts of ethyl acetate were dropped to deactivate an unreacted hydride, and 5000 parts of a 50% phosphoric acid aqueous solution were further dropped. After cooled, the mixture was separated into a supernatant liquid and a solid content by centrifugation. To distilled water was added the obtained supernatant liquid to precipitate a polymer (first polymer). On the other hand, to the obtained solid content was added 10000 parts of ethanol, the mixture was heated for dissolution at 60° C. for 1 hour and filtered with a glass filter, the obtained filtrate was condensed with an evaporator, and then the condensed filtrate was added to distilled water to precipitate a polymer (second polymer). The polymers (first polymer and second polymer) obtained by the precipitation treatments were mixed together, was supplied with distilled water at 100° C., and sufficiently washed by boiling. After the washing, the mixture was filtered to give a homopolymer of methallyl alcohol, or PMAL-1. The PMAL-1 had a water content of 200 mass %.

Production Examples 2 to 7: Synthesis of PMAL

PMALs (PMALs-2 to 7, respectively) were obtained in the same manner as in Production Example 1 except for using, in place of polymethyl methacrylate, a methyl methacrylate copolymer obtained by radical polymerization of the raw materials shown in Table 1. The PMALs-2 to 7 had a water content of 200 mass %.

The radical polymerization was performed by adding 0.1 parts of 2,2'-azobisisobutyronitrile (AIBN) to a total 100 parts of the raw materials shown in Table 1 and heating the mixture at 80° C. in toluene.

TABLE 1

| | Raw material composition (mol %)/(mol %) | Obtained PMAL No. |
|---|---|---|
| Production Example 1 | Methyl methacrylate (100) | PMAL-1 |
| Production Example 2 | Methyl methacrylate (85)/ Methyl acrylate (15) | PMAL-2 |
| Production Example 3 | Methyl methacrylate (70)/ Methyl acrylate (30) | PMAL-3 |
| Production Example 4 | Methyl methacrylate (30)/ Methyl acrylate (70) | PMAL-4 |
| Production Example 5 | Methyl methacrylate (75)/ styrene (25) | PMAL-5 |
| Production Example 6 | Methyl methacrylate (25)/ Methyl acrylate (75) | PMAL-6 |
| Production Example 7 | Methyl methacrylate (25)/ styrene (75) | PMAL-7 |

Production Example 8: Synthesis of PMAL

PMAL-8 was obtained in the same manner as in Production Example 1 except for replacing the polymethyl methacrylate synthesized above with "GF" (brand) of "PARA-PET (registered trade name)" manufactured by KURARAY CO., LTD. The PMAL-8 contained a structural unit represented by the formula (1) in an amount of about 88 mol % and had a structural unit derived from allyl alcohol. The PMAL-8 had a water content of 200 mass %.

Example 1

The PMAL-1 in an amount of 2.4 kg was charged into 14.4 L of an aqueous solution obtained by dissolving acetic acid and sodium acetate in ion-exchanged water so that the concentration of acetic acid was 0.455 g/L and the concentration of sodium acetate was 0.364 g/L, and immersion was performed at 25° C. for 6 hours while the mixture was sometimes stirred. The immersed PMAL-1 was dehydrated by centrifugal dehydration and dried at 80° C. for 3 hours and subsequently at 120° C. for 24 hours in a hot air drying machine to give a PMAL resin composition.

Table 2 shows results of the measurement items [3], [4], and [6] to [9] and the evaluation items. In the structural analysis of the PMAL-1 according to the method described above, $I_1:I_2:I_3$ was 3:2:2 and $I_5:I_6:I_7:I_8$ was 1:1:1:1, and the degree of progress of a reduction reaction was 100 mol %. In the resin composition of Example 1, the $MFR_{15}/MFR_3$ was 0.92 in the evaluation of long-run properties, the peel strength was 530 g/15 mm in the evaluation of interlayer adhesiveness, and the oxygen permeability in the evaluation of gas barrier properties was a detection limit, that is, less than 0.01 mL/(m$^2$·day·atm). In addition, no fish eyes, streaks, gel, and granules can be found in the resin composition layer of the multilayer film manufactured for evaluation of interlayer adhesiveness.

Examples 2 to 32 and Comparative Examples 1 to 11

A PMAL resin composition was obtained in the same manner as in Example 1 except for changing the type of the PMAL and the type and the concentration of the compound contained in the aqueous solution for immersing the PMAL to those described in Tables 2 to 4. The same tables show results of the measurement items [3], [4], and [6] to [9] and the evaluation items. In the meantime, ammonia was used in place of the acid in Comparative Example 5. The unit of the content "μmol/g" represents the number of micromoles per 1 g of the PMAL.

Example 33

The PMAL-1 obtained in Production Example 1 was dried in a vacuum drier at 60° C. for 5 hours to give PMAL-1a having a water content of 20 mass %. The PMAL-1a was charged into a cylinder barrel of a twin screw extruder having a detailed specification described below from a first raw material supply portion at 10 kg/hr, the resin temperature at a discharge port was set to 130° C., and the molten water-containing PMAL was supplied with an aqueous solution containing acetic acid at a concentration of 8.57 g/L and sodium acetate at a concentration of 7.13 g/L, at a 0.83 L/hr from a second raw material supply portion near a discharge port-end tip. A molten PMAL resin composition in a strand shape that was discharged from a die was cut with a strand cutter to give a water-containing PMAL resin composition (water content: 30 mass %). The obtained water-containing PMAL resin composition was dried at 80° C. for 3 hours and subsequently at 120° C. for 15 hours in a hot air drying machine to give a dry PMAL resin composition. Table 3 shows results of the measurement items [3], [4], and [6] to [9] and the evaluation items for the obtained composition.

(Detailed Specification of Twin Screw Extruder)

| | |
|---|---|
| Diameter | 30 mmφ |
| L/D | 45.5 |
| Screw | Equi-directional complete meshing type |
| Screw speed | 300 rpm |
| Die | 3 mmφ, 5 hole strand die |
| Take-up speed | 5 m/min |

Comparative Example 12

A dry PMAL resin composition was obtained in the same manner as in Example 33 except for supplying, in place of the solution containing acetic acid and sodium acetate, ion-exchanged water from the second raw material supply portion. Table 4 shows results of the measurement items [3], [4], and [6] to [9] and the evaluation items for the obtained composition.

TABLE 2

| | | Component added to aqueous solution | | | | Resin Composition At least one of acid component and anion of acid component (B) | | |
|---|---|---|---|---|---|---|---|---|
| | | Acid | | Salt | | | | |
| | Type of PMAL | Type | Concentration (g/L) | Type | Concentration (g/L) | Type | pKa | Content (μmol/g) |
| Example 1 | PMAL-1 | Acetic acid | 0.145 | Sodium acetate | 0.364 | Acetic acid | 4.56 | 11.6 |
| Example 2 | PMAL-1 | Acetic acid | 0.145 | Potassium acetate | 0.435 | Acetic acid | 4.56 | 11.6 |
| Example 3 | PMAL-1 | Acetic acid | 0.145 | Sodium acetate<br>Magnesium acetate | 0.435<br>0.030 | Acetic acid | 4.56 | 12.4 |
| Example 4 | PMAL-1 | Acetic acid | 0.145 | Sodium acetate<br>Calcium acetate | 0.435<br>0.033 | Acetic acid | 4.56 | 12.4 |
| Example 5 | PMAL-1 | Acetic acid | 0.225 | Sodium chloride | 0.635 | Acetic acid | 4.56 | 4.5 |
| Example 6 | PMAL-1 | Acetic acid | 0.225 | Sodium chloride | 1.037 | Acetic acid | 4.56 | 4.5 |
| Example 7 | PMAL-1 | Acetic acid | 0.225 | Sodium chloride | 1.335 | Acetic acid | 4.56 | 4.5 |
| Example 8 | PMAL-1 | Acetic acid | 0.205 | Sodium acetate | 0.109 | Acetic acid | 4.56 | 6.7 |
| Example 9 | PMAL-1 | Acetic acid | 0.204 | Sodium acetate | 0.022 | Acetic acid | 4.56 | 4.6 |
| Example 10 | PMAL-1 | Acetic acid | 0.198 | Sodium acetate | 0.002 | Acetic acid | 4.56 | 4.0 |
| Example 11 | PMAL-1 | Acetic acid | 0.195 | — | — | Acetic acid | 4.56 | 3.9 |
| Example 12 | PMAL-1 | Butyric acid | 0.181 | — | — | Butyric acid | 4.63 | 3.9 |
| Example 13 | PMAL-1 | Propionic acid | 0.152 | — | — | Propionic acid | 4.67 | 3.9 |
| Example 14 | PMAL-1 | Citric acid | 0.394 | — | — | Citric acid | 4.35 | 3.9 |

| | Resin Composition Metal ion (C) | | Evaluation result | | | |
|---|---|---|---|---|---|---|
| | Type | Content (μmol/g) | Coloring resistance | Long-run properties | Interlayer adhesiveness | Gas barrier properties |
| Example 1 | Na | 8.7 | A | A | A | A |
| Example 2 | K | 8.7 | A | A | A | A |

TABLE 2-continued

| | | | | | | | |
|---|---|---|---|---|---|---|---|
| Example 3 | Na Mg | 9.1 (Na8.7/Mg0.4) | A | A | A | A | |
| Example 4 | Na Ca | 9.1 (Na8.7/Ca0.4) | A | A | A | A | |
| Example 5 | Na | 21.3 | A | A | A | A | |
| Example 6 | Na | 34.8 | B | B | A | A | |
| Example 7 | Na | 44.8 | C | B | A | A | |
| Example 8 | Na | 2.6 | A | A | A | A | |
| Example 9 | Na | 0.52 | B | B | B | A | |
| Example 10 | Na | 0.051 | B | C | C | A | |
| Example 11 | — | — | B | C | D | A | |
| Example 12 | — | — | B | C | D | A | |
| Example 13 | — | — | B | C | D | A | |
| Example 14 | — | — | B | D | D | A | |

TABLE 3

| | | Component added to aqueous solution | | | | Resin Composition At least one of acid component and anion of acid component (B) | | |
|---|---|---|---|---|---|---|---|---|
| | | Acid | | Salt | | | | |
| | Type of PMAL | Type | Concentration (g/L) | Type | Concentration (g/L) | Type | pKa | Content (μmol/g) |
| Example 15 | PMAL-1 | Tartaric acid | 0.308 | — | — | Tartaric acid | 3.95 | 3.9 |
| Example 16 | PMAL-1 | Lactic acid | 0.185 | — | — | Lactic acid | 3.66 | 3.9 |
| Example 17 | PMAL-1 | Phosphonic acid | 0.168 | — | — | Phosphonic acid | 6.79 | 3.9 |
| Example 18 | PMAL-1 | Phosphoric acid | 0.201 | — | — | Phosphoric acid | 7.20 | 3.9 |
| Example 19 | PMAL-1 | Acetic acid | 0.839 | — | — | Acetic acid | 4.56 | 16.8 |
| Example 20 | PMAL-1 | Acetic acid | 1.241 | — | — | Acetic acid | 4.56 | 24.8 |
| Example 21 | PMAL-1 | Acetic acid | 1.726 | — | — | Acetic acid | 4.56 | 34.5 |
| Example 22 | PMAL-1 | Acetic acid | 0.029 | — | — | Acetic acid | 4.56 | 0.21 |
| Example 23 | PMAL-1 | Acetic acid | 0.015 | — | — | Acetic acid | 4.56 | 0.102 |
| Example 24 | PMAL-1 | Acetic acid | 0.002 | — | — | Acetic acid | 4.56 | 0.013 |
| Example 25 | PMAL-1 | — | — | Sodium acetate | 0.364 | Acetic acid | 4.56 | 8.2 |
| Example 26 | PMAL-2 | Acetic acid | 0.145 | Sodium acetate | 0.364 | Acetic acid | 4.56 | 11.6 |
| Example 27 | PMAL-3 | Acetic acid | 0.145 | Sodium acetate | 0.364 | Acetic acid | 4.56 | 11.6 |
| Example 28 | PMAL-4 | Acetic acid | 0.145 | Sodium acetate | 0.364 | Acetic acid | 4.56 | 11.6 |
| Example 29 | PMAL-5 | Acetic acid | 0.145 | Sodium acetate | 0.364 | Acetic acid | 4.56 | 11.6 |
| Example 30 | PMAL-8 | Acetic acid | 0.145 | Sodium acetate | 0.364 | Acetic acid | 4.56 | 11.6 |
| Example 31 | PMAL-1 | Acetic acid | 6.900 | — | — | Acetic acid | 4.56 | 138 |
| Example 32 | PMAL-1 | Acetic acid | 1.726 | Sodium carbonate | 3.221 | Acetic acid | 4.56 | 34.5 |
| Example 33 | PMAL-1 | Acetic acid | 2.914 | Sodium acetate | 7.310 | Acetic acid | 4.56 | 11.6 |

| | Resin Composition | | Evaluation result | | | |
|---|---|---|---|---|---|---|
| | Metal ion (C) | | | | | Gas |
| | Type | Content (μmol/g) | Coloring resistance | Long-run properties | Interlayer adhesiveness | barrier properties |
| Example 15 | — | — | B | D | D | A |
| Example 16 | — | — | B | C | D | A |
| Example 17 | — | — | B | C | D | A |
| Example 18 | — | — | B | D | D | A |
| Example 19 | — | — | B | C | D | A |
| Example 20 | — | — | C | C | D | A |
| Example 21 | — | — | D | D | D | A |
| Example 22 | — | — | B | C | D | A |
| Example 23 | — | — | C | C | D | A |
| Example 24 | — | — | D | D | D | A |
| Example 25 | Na | 8.7 | B | B | A | A |
| Example 26 | Na | 8.7 | A | A | A | B |
| Example 27 | Na | 8.7 | A | A | A | C |
| Example 28 | Na | 8.7 | A | A | A | D |
| Example 29 | Na | 8.7 | A | A | A | C |
| Example 30 | Na | 8.7 | A | A | A | B |
| Example 31 | — | — | E | E | D | A |
| Example 32 | Na | 128 | E | E | A | A |
| Example 33 | Na | 8.7 | A | A | A | A |

TABLE 4

| | Type of PMAL | Component added to aqueous solution | | | | Resin Composition At least one of acid component and anion of acid component (B) | | |
|---|---|---|---|---|---|---|---|---|
| | | Acid | | Salt | | | | |
| | | Type | Concentration (g/L) | Type | Concentration (g/L) | Type | pKa | Content (μmol/g) |
| Comparative Example 1 | PMAL-1 | — | — | — | — | — | — | — |
| Comparative Example 2 | PMAL-1 | Acetic acid | 0.001 | — | — | Acetic acid | 4.56 | 0.008 |
| Comparative Example 3 | PMAL-1 | Hydrochloric acid | 0.178 | — | — | Hydrochloric acid | −8.0 | 3.9 |
| Comparative Example 4 | PMAL-1 | Sulfuric acid | 0.213 | — | — | Sulfuric acid | 1.99 | 3.9 |
| Comparative Example 5 | PMAL-1 | Ammonia | 0.133 | — | — | Ammonia | 9.25 | 3.9 |
| Comparative Example 6 | PMAL-2 | — | — | — | — | — | — | — |
| Comparative Example 7 | PMAL-3 | — | — | — | — | — | — | — |
| Comparative Example 8 | PMAL-4 | — | — | — | — | — | — | — |
| Comparative Example 9 | PMAL-6 | Acetic acid | 0.145 | Sodium acetate | 0.364 | Acetic acid | 4.56 | 11.6 |
| Comparative Example 10 | PMAL-5 | — | — | — | — | — | — | — |
| Comparative Example 11 | PMAL-7 | Acetic acid | 0.145 | Sodium acetate | 0.364 | Acetic acid | 4.56 | 11.6 |
| Comparative Example 12 | PMAL-1 | — | — | — | — | — | — | — |

| | Resin Composition Metal ion (C) | | Evaluation result | | | |
|---|---|---|---|---|---|---|
| | Type | Content (μmol/g) | Coloring resistance | Long-run properties | Interlayer adhesiveness | Gas barrier properties |
| Comparative Example 1 | — | — | E | F | D | A |
| Comparative Example 2 | — | — | E | F | D | A |
| Comparative Example 3 | — | — | E | F | D | A |
| Comparative Example 4 | — | — | E | F | D | A |
| Comparative Example 5 | — | — | E | F | D | A |
| Comparative Example 6 | — | — | E | F | D | B |
| Comparative Example 7 | — | — | E | F | D | C |
| Comparative Example 8 | — | — | E | F | D | D |
| Comparative Example 9 | Na | 8.70 | A | A | A | E |
| Comparative Example 10 | — | — | E | F | D | C |
| Comparative Example 11 | Na | 8.70 | A | A | A | E |
| Comparative Example 12 | — | — | E | F | D | A |

Example 34: Manufacturing of Single Layer Film

The PMAL resin composition obtained in Example 1 was pelletized by melt extrusion at 220° C. by LABO PLASTOMILL (manufactured by Toyo Seiki Seisaku-sho, Ltd.) with a twin screw extruder having a screw diameter of 20 mm. A single layer film having a thickness of 15 μm was obtained by forming a single layer film, with use of the obtained pellets, by LABO PLASTOMILL (manufactured by Toyo Seiki Seisaku-sho, Ltd.) with a single screw extruder (screw diameter 20 mm) and a coat hanger die (width 300 mm, a lip gap 0.3 mm), at a die temperature of 220° C. The obtained single layer film was colorless and transparent and had an excellent appearance.

Example 35: Manufacturing of Laminated Film

On both surfaces of the single layer film obtained in Example 34 was laminated a low-density polyethylene (LDPE) film having a corona-treated surface that is to be adhered and having a thickness of 50 μm with a urethane adhesive agent interposed between both the surfaces and the LDPE film to give a laminated film having a structure of LDPE/PMAL resin composition/LDPE=50 μm/15 μm/50 μm. Two 10-cm square films were cut out from the obtained laminated film between which 20 g of ketchup was disposed, and the films were heat-sealed in a nitrogen box and subjected to a storage test at 40° C. and a relative humidity of 50% for 180 days. As a result, no change in color was found in ketchup.

Example 36: Application of PMAL Resin Composition to Adhesive Agent

A laminated film having a structure of LDPE/EF-F/LDPE was obtained in the same manner as in Example 35 except for using, in place of an intermediate layer made from the PMAL resin composition, a film that was made from "EF-F" manufactured by KURARAY CO., LTD. and that had a thickness of 15 μm, and using, as the urethane adhesive agent, one obtained by adding the PMAL resin composition to the urethane adhesive agent used in Example 35 so that the content of the PMAL resin composition became 10 mass % of the whole adhesive agent. The same evaluation as in Example 35 was performed and no change in color was found in ketchup.

Example 37: Manufacturing of Pouch

A urethane-isocyanate adhesive agent ("TAKELAC A-385"/"TAKENATE A-10" manufactured by Takeda Pharmaceutical Company Limited) was applied at a weight of a solid content per area of 2.5 g/m² onto a surface of a biaxially stretched polypropylene film (OPP, "Tohcello OP U-1" manufactured by Tohcello Co., Ltd., melting point 155° C., thickness 20 μm), and then the single layer film obtained in Example 34 was laminated on the adhesive agent-applied surface by a dry lamination method. Next, a linear low-density polyethylene film (LLDPE, "Tohcello TUX-TC" manufactured by Tohcello Co., Ltd., density 0.92 g/cm³, thickness 65 μm) was laminated on a surface of the single layer film by the same dry lamination method to manufacture a multilayer structure (laminated film having a total thickness of 100 μm) having a structure of OPP/PMAL resin composition/LLDPE. Next, the multilayer structure was sealed with the surface of LLDPE as a seal surface to manufacture a pouch, and then the following items (1) and (2) were evaluated.

(1) Bag-Making Processability

With use of the high-speed automatic bag making machine "HSE-500A" manufactured by NISHIBE KIKAI CO., LTD., a three end-sealed bag (pouch, 150×230 mm, sealing width 15 mm) was made at a seal bar temperature of 180° C. and at a bag-making speed of 85 bags/min. The pouch made was excellent in terms of appearance of a sealed surface (presence or absence of appearance defects such as a dart, a pinhole, waving, whitening, and seal shifting) and seal strength.

(2) Appearance

The three end-sealed bag (pouch) was visually checked to comprehensively determine its appearance in terms of presence or absence of appearance defects such as gel, fish eyes, streaks, wood-grain patterns, and coloring, and transparency (whitening feeling).

Example 38: Manufacturing of Hollow Molded Container

With use of the direct blow multilayer hollow molding machine TB-ST-6P manufactured by Yugen Kaisha Suzuki Tekkosho, a 3-component 5-layer hollow molded container (volume 350 ml) was molded by a direct blow molding method with the PMAL resin composition obtained in Example 1 set as an intermediate layer, polypropylene (PP, "B200" manufactured by Mitsui Petrochemical Industries, Ltd.) as inner and outer layers, and further maleic anhydride-modified polypropylene (M-PP, "Admer QB540" manufactured by Mitsui Petrochemical Industries, Ltd.) as an adhesive layer, so that the container had a trunk thickness structure of PP (320 μm, outer layer)/M-PP (10 μm)/PMAL resin composition/M-PP (10 μm)/PP (350 μm, inner layer) and a total thickness of 700 μm. The moldability and the appearance of the container were very excellent. A die temperature during the molding was set to 220° C., and a blow mold temperature was 25° C.

Example 39: Manufacturing of Vacuum Insulator

A vacuum insulator was manufactured with use of the multilayer structure that was obtained in Example 37 and had a structure of OPP/PMAL resin composition/LLDPE. Specifically, first, the multilayer structure was cut into two multilayer structures having a predetermined shape. Next, the two multilayer structures were stacked with the OPP layers inside and heat-sealed at three sides of the rectangle to form a bag. Next, an insulative core material was charged from an aperture of the bag, and the bag was sealed at a temperature of 20° C. and an internal pressure of 10 Pa with use of a vacuum packing machine (VAC-STAR 2500 manufactured by Frimark GmbH). Thus, the vacuum insulator was manufactured without problems. As the insulative core material, a silica fine powder was used that was dried at 120° C. for 4 hours.

Example 40: Manufacturing of Coating Film

A coating film was manufactured with use of the PMAL resin composition obtained in Example 1. Specifically, 0.5 g of the PMAL resin composition obtained in Example 1 was dissolved in 9.5 g of 1-propanol to prepare a coating liquid. Subsequently, the coating liquid was applied with a bar coater onto a biaxially stretched polyethylene terephthalate film having a surface thereof corona-treated and having a thickness of 12 μm, namely "P60" (brand) of "Lumirror" (registered trade name) manufactured by Toray Industries, Inc. so that a dried coating had a thickness of 1.0 μm on the corona treated surface. The coated film was dried at 100° C. for 5 minutes and subsequently at 140° C. for 10 minutes to form a PMAL resin composition layer on the polyethylene terephthalate film. Thus, the coating film (multilayer structure) could be obtained that had an excellent appearance and had a structure of polyethylene terephthalate/PMAL resin composition layers.

Example 41: Manufacturing of Solar Battery Module

A solar battery module was manufactured with use of the multilayer structure obtained in Example 40. Specifically, first, an amorphous silicon solar battery cell provided on a 10-cm square piece of hardened glass was held in an ethylene-vinyl acetate copolymer film having a thickness of 450 μm. Next, the multilayer structure was placed on the film and attached together so that the polyethylene terephthalate layer of the multilayer structure was directed outside, to manufacture a solar battery module. The attachment was performed by vacuuming at 150° C. for 3 minutes and then crimping for 9 minutes. The thus manufactured solar battery module operated excellently and exhibited excellent electric output characteristics over a long period of time.

Example 42: Application of PMAL Resin Composition to Powder Coating

The PMAL resin composition obtained in Example 1 was subjected to a low-temperature pulverizer (use of liquid nitrogen) and a powder was obtained whose particles passed through a 20 wire mesh but remained on a 100 wire mesh. The obtained powder was charged into thermal spraying equipment, sprayed onto a 150×250×2 mm-sized steel sheet that had been degreased and washed with a solvent, and cooled in the air. Thereby, steel sheets were obtained that had a PMAL resin composition layer with an average thickness of 55 μm and that had a PMAL resin composition layer with an average thickness of 400 μm. Both the steel sheets were excellent in glossiness and smoothness of the PMAL resin composition layer.

Example 43: Manufacturing of Liquid Packing Paper Container

Both surfaces of paper (a paper board) as a base material were subjected to a flame treatment, and then 50-μm-thick low-density polyethylene (LDPE) was laminated on both the surfaces of the paper by an extrusion coating method to manufacture a 3-layer structure having a structure of LDPE/paper/LDPE. A surface of the 3-layer structure, that is, a low-density polyethylene layer was corona-treated, and then, the PMAL resin composition obtained in Example 1 was laminated on the corona-treated surface by an extrusion coating method at a thickness of 15 μm to manufacture a multilayer structure having a structure of four layers.

A paper container was manufactured from the multilayer structure having a structure of four layers so that the PMAL resin composition layer was directed inside and the paper container had a gable top having a size of 7 cm (length)×7 cm (width)×19 cm (height), and the paper container was filled with orange juice, the air in the paper container was replaced with nitrogen, and the paper container was heat-sealed at the upper portion for encapsulation. As a result of a sensory test of alternation in taste after 10 week storage in an environment at 20° C. and 100% RH, the quality of the content hardly changed from before the storage.

Example 44: Manufacturing of Thermoformed Container

With the PMAL resin composition obtained in Example 1 set as an intermediate layer, homopolypropylene (PP, "J103" manufactured by Grand Polymer Co., Ltd., MI=3.0 g/10 min (230° C., load 2160 g), Vicat softening point 155° C.) as inner and outer layers, and maleic anhydride-modified polypropylene ("Admer QF500" manufactured by Mitsui Petrochemical Industries, Ltd., MI=5.3 g/10 min (230° C., load 2160 g)) as an adhesive agent (AD) layer, a thermoforming sheet was obtained by a co-extruder with a T die, the thermoforming sheet being a 3-component 5-layer (PP/AD/PMAL resin composition/AD/PP=thickness 400 μm/20 μm/20 μm/20 μm/400 μm), 860 μm in total thickness. The obtained sheet was thermoformed (use of compressed air: 5 kg/cm², plug: 45φ×65 mm, syntax form, plug temperature: 150° C., mold temperature: 70° C.) into a cup shape (mold shape 70φ×70 mm, draw ratio S=1.0) at a sheet temperature of 150° C. by a thermoforming machine (manufactured by Asano Laboratories Co., Ltd.), so that a thermoformed container could be obtained that had an excellent appearance.

Example 45: Manufacturing of Shrink Film

The PMAL resin composition obtained in Example 1 was pelletized by melt extrusion at 210° C. by LABO PLASTOMILL (manufactured by Toyo Seiki Seisaku-sho, Ltd.) with a twin screw extruder having a screw diameter of 20 mm. The obtained pellets were subjected to a 3-component 5-layer co-extruder to manufacture a multilayer sheet (ionomer resin layer/adhesive resin layer/PMAL resin composition layer/adhesive resin layer/ionomer resin layer). The thickness of the layers that constitute the sheet was 250 μm for both the outermost ionomer resin ("Himilan 1652" manufactured by DUPONT-MITSUI POLYCHEMICALS CO., LTD.) layers, 30 μm for the adhesive resin ("Admer NF500" manufactured by Mitsui Petrochemical Industries, Ltd.) layers, and 90 μm for the PMAL resin composition layer. The obtained sheet was subjected to a pantagraph type biaxial stretching machine to perform simultaneous biaxial stretching at a stretch ratio of 4×4 times at 90° C., so that a shrink film was obtained that had a thickness structure of the layers of 15/2/6/2/15 μm, 40 μm in total thickness.

The obtained multilayer shrink film had no unevenness and uneven thickness and was relatively excellent in appearance and transparency. Further, the multilayer shrink film was folded in two, heat-sealed at two ends (both sides) to manufacture a bag, and heat-sealed at a charging port under vacuum after processed meat was charged into the bag. Thereafter, the vacuum-packed bag was immersed in hot water at 85° C. for 5 seconds to thermally shrink the film. As a result, the film firmly attached to the meat had no creases, was small in abnormal transformation of the content, and thus was relatively excellent.

Example 46: Manufacturing of Pipe

The PMAL resin composition obtained in Example 1 was subjected to a 4-component 5-layer co-extrusion multilayer pipe molding apparatus to manufacture a pipe having an outer diameter of 20 mm. The structure of the pipe was an outermost layer that was made from 12 polyamide (UBE Nylon 30200 manufactured by Ube Industries, Ltd.) and had a thickness of 450 μm/an adhesive resin layer (Admer VF500 manufactured by Mitsui Petrochemical Industries, Ltd.) having a thickness of 50 μm/a 6 polyamide layer (AMILAN CM1046 manufactured by Toray Industries, Inc.) having a thickness of 100 μm/a PMAL resin composition layer having a thickness of 150 μm/an innermost layer that was made from 6 polyamide (AMILAN CM1046 manufactured by Toray Industries, Inc.) and had a thickness of 250 μm.

Next, water having dissolved oxygen removed therefrom with use of a packed column filled with metallic tin was circulated in the pipe manufactured above, and measurement was performed to obtain an increase rate of concentration of oxygen dissolved in the water at a temperature of 70° C. The increase rate μg/(L·hr) referred to herein indicates an increase rate μg/hr of dissolved oxygen per 1 L of water in the pipe. That is, with the volume of water in all the systems of the apparatus including the pipe defined as Vcc, the volume of water in the pipe as V'cc, and increase amount in concentration of oxygen in water circulated in the apparatus per unit hour as B μg/(L·hr), the increase rate of dissolved oxygen A μg/(L·hr) indicates a value calculated by A=B·(V/

V'). As a result of measuring the increase rate in concentration of dissolved oxygen in the pipe at a relative humidity of 80% in an external atmosphere, the increase rate in dissolved oxygen was 1 μg/(L·hr), and an excellent result could be obtained.

<Example 47: Manufacturing of Fuel Tank (Blow Molded Container)>

A blow molded container was manufactured with use of the PMAL resin composition obtained in Example 1 and a collected resin that was prepared from the PMAL resin composition and is described below.

(1) Preparation of Collected Resin

After dry blending of 4 parts by mass of the PMAL resin composition obtained in Example 1, 86 parts by mass of high-density polyethylene ("HZ8200B" available from Mitsui Chemicals, Inc., melt flow rate (MFR) at 190° C. and a load of 2160 g=0.01 g/10 min), and 10 parts by mass of an adhesive resin ("ADMER GT-6A" available from Mitsui Chemicals, Inc., melt flow rate at 190° C. and a load of 2160 g=0.94 g/10 min), the blended materials were subjected to extrusion pelletization in a nitrogen atmosphere with use of a twin screw extruder ("2D25W" available from Toyo Seiki Seisaku-sho, Ltd., 25 mmφ, die temperature 220° C., screw speed 100 rpm). Further, in order to obtain a model collected resin, the extruded pellets were further subjected to the same extruder and extruded under the same conditions for pelletization, and the same operation was performed four times in total (the blending is performed by the extruder five times in total) to give a collected resin.

(2) Manufacturing of Fuel Tank (Blow Molded Container)

With use of the dry pellets of the PMAL resin composition, the high-density polyethylene, the adhesive resin, and the collected resin, a blow molded container was manufactured that had a 4-component 6-layer structure of (inside) high-density polyethylene/adhesive resin/PMAL resin composition/adhesive resin/collected resin/PMAL resin composition (outside), by the blow molding machine "TB-ST-6P" available from Suzuki Tekkosho, at 210° C. In the production of the blow molded container, cooling was performed at a mold internal temperature of 15° C. for 20 seconds, and a 3-L tank was molded that had a total layer average thickness of 1000 μm ((inside) high-density polyethylene/adhesive resin/PMAL resin composition/adhesive resin/collected resin/PMAL resin composition (outside)=(inside) 340/50/40/50/400/120 μm (outside)). The bottom diameter of the tank was 100 mm, and the height was 400 mm. The obtained blow molded container was evaluated in terms of appearance and was found to be an excellent container having less streaks or the like.

Example 48: Manufacturing of Single Layer Film Having Nylon Blended Therein, and Laminated Film and Pouch Including Single Layer Film After dry blending of 80 parts by mass of the PMAL resin composition obtained in Example 1 and 20 parts by mass of a polyamide ("Ny1018A" (Nylon 6) available from Ube Industries, Ltd.), the blended materials were subjected to extrusion pelletization in a nitrogen atmosphere with use of a twin screw extruder (Toyo Seiki Seisaku-sho, Ltd., 2D25W, 25 mmφ under the extrusion conditions of a die temperature of 250° C. and a screw speed of 100 rpm.

Next, with use of a single screw extruder (Toyo Seiki Seisaku-sho, Ltd., D2020, D (mm)=20, L/D=20, compression ratio=2.0, screw: full-flight), a single layer film having a thickness of 20 μm was manufactured from the extruded pellets. Extrusion conditions are indicated as follows.

Extrusion temperature: 250° C.
Screw speed: 40 rpm
Die width: 30 cm
Take-up roll temperature: 80° C.
Take-up roll speed: 3.1 m/min The obtained single layer film, a commercially available biaxially stretched Nylon 6 film ("EMBLEM ON," available from UNITIKA LTD., average thickness 15 μm), and a commercially available unstretched polypropylene film ("Tohcello CP" available from Mitsui Chemicals Tohcello, Inc., average thickness 60 μm) were cut into a A4 size, an adhesive agent for dry lamination was applied onto both surfaces of the single layer film, dry lamination was performed so that the Nylon 6 film became an outer layer and the unstretched polypropylene film became an inner layer, and drying was performed at 80° C. for 3 minutes, to give a 3-layer transparent laminated film. Used as the adhesive agent for dry lamination was one containing "TAKELAC A-385" available from Mitsui Chemicals, Inc. as a main agent, "TAKENATE A-50" available from Mitsui Chemicals, Inc. as a curing agent, and ethyl acetate as a diluting fluid. The application amount of the adhesive agent was 4.0 g/m². After the lamination, curing was performed at 40° C. for three days.

With use of the obtained laminated film, a pouch was manufactured that was sealed at four ends of a square with an inside dimension of 12×12 cm. Water was poured into the pouch as a content. The pouch was subjected to a retort treatment at 120° C. for 20 minutes with use of a retorting apparatus (high-temperature and high-pressure cooking sterilization tester "RCS-40RTGN" available from Hisaka Works, Ltd.). After the retort treatment, water on the surface of the pouch was wiped off, the pouch was left to stand in a high temperature and humidity chamber at 20° C. and 65% RH for one day, and then appearance characteristics of the pouch was evaluated as evaluation of retort resistance and determined to be excellent without large changes.

REFERENCE SIGNS LIST

10: Vertically-made, filled, and sealed bag, 11: Multilayer structure, 11a: Edge, 11b: Body, 11c: Periphery, 20: Flat pouch, 30: Vacuum insulator, 31: Core material, 40: Electronic device, 41: Electronic device main body, 42: Sealing member, 43: Protective sheet (multilayer structure)

The invention claimed is:
1. A resin composition consisting of:
polymethallyl alcohol (A) consisting of a repeating structural unit represented by formula (1) in an amount of greater than or equal to 70 mol % to 100 mol %, and optionally another structural unit derived from (meth) acrylic acid ester, allyl alcohol, or styrene:

and
a component (B) that is at least one selected from the group consisting of acetic acid, butyric acid, propionic acid, citric acid, tartaric acid, lactic acid, phosphonic acid, and phosphoric acid, wherein a content of the component (B) is greater than or equal to 0.01 µmol and lower than or equal to 34.5 µmol per 1 g of the polymethallyl alcohol (A), the resin composition optionally includes a component (C) that is an alkali metal ion and/or an alkaline earth metal ion, wherein if the resin composition includes the component (C), then a content of the component (C) is 0.05 to 45 µmol per 1 g of the polymethallyl alcohol (A), the resin composition optionally includes at least one additive (D) selected from the group consisting of an ultraviolet absorber, a plasticizer, an antistatic agent, a non-metal-containing thermal stabilizer, a lubricant, a coloring agent, and a solvent, and wherein a ratio $MFR_{15}/MFR_3$ is from 0.3 to less than 1.7, wherein $MFR_3$ is a weight of the resin composition discharged for 1 minute when the resin composition is held in a melt indexer at a temperature of 210° C. and a load of 2160 g for 3 minutes, and $MFR_{15}$ is a weight of the resin composition discharged for 1 minute when the resin composition is held in the melt indexer at a temperature of 210° C. and a load of 2160 g for 15 minutes.

2. The resin composition according to claim 1, including the component (C).

3. The resin composition according to claim 1, wherein if the resin composition includes a transition metal ion, then a content of the transition metal ion is lower than or equal to 22 µmol per 1 g of the polymethallyl alcohol (A).

4. The resin composition according to claim 1, wherein the resin composition does not include a transition metal ion in an amount of more than 2.5 µmol per 1 g of the polymethallyl alcohol (A).

5. The resin composition according to claim 1, wherein the resin composition does not include a transition metal ion.

6. The resin composition according to claim 1, wherein the resin composition does not include a polymer compound other than the polymethallyl alcohol (A).

7. A molding comprising the resin composition according to claim 1.

8. The molding according to claim 7, comprising at least one layer that contains the resin composition.

9. The molding according to claim 7, having a multilayer structure comprising at least one layer that contains the resin composition and at least one other layer.

10. The molding according to claim 9, wherein the multilayer structure comprises the at least one layer that contains the resin composition and a thermoplastic resin layer laminated on one surface or both surfaces of the layer that contains the resin composition.

11. The molding according to claim 10, wherein the at least one layer that contains the resin composition has a thickness of 0.1 to 1000 µm.

12. The molding according to claim 7, which is a packing material.

13. A method of producing the resin composition according to claim 1, the method comprising:
producing the polymethallyl alcohol (A); and
mixing the polymethallyl alcohol (A) with the component (B).

14. The method according to claim 13, wherein the mixing includes contacting the polymethallyl alcohol (A) with a liquid containing the component (B).

15. The method according to claim 13, wherein the mixing includes adding a liquid containing the component (B) to the polymethallyl alcohol (A) melted.

16. The method according to claim 14, wherein the liquid containing the component (B) further contains the component (C).

17. The method according to claim 13, wherein the mixing includes dry-blending the component (B) with the polymethallyl alcohol (A).

18. The method according to claim 15, wherein the liquid containing the component (B) further contains the component (C).

* * * * *